US012327939B2

(12) United States Patent
Shindo et al.

(10) Patent No.: US 12,327,939 B2
(45) Date of Patent: Jun. 10, 2025

(54) CONNECTOR

(71) Applicant: J.S.T. Mfg. Co., Ltd., Tokyo (JP)

(72) Inventors: Satoru Shindo, Yokohama (JP); Hiroshi Kitamura, Yokohama (JP); Teppei Uetsuji, Yokohama (JP)

(73) Assignee: J.S.T. MFG. CO., LTD., Tokyo (JP)

( * ) Notice: Subject to any disclaimer, the term of this patent is extended or adjusted under 35 U.S.C. 154(b) by 362 days.

(21) Appl. No.: 18/094,781

(22) Filed: Jan. 9, 2023

(65) Prior Publication Data

US 2023/0246352 A1 Aug. 3, 2023

(30) Foreign Application Priority Data

Jan. 14, 2022 (JP) ................................ 2022-004272

(51) Int. Cl.
*H01R 12/55* (2011.01)
*H01R 13/11* (2006.01)
*H01R 13/502* (2006.01)

(52) U.S. Cl.
CPC ............ *H01R 12/55* (2013.01); *H01R 13/11* (2013.01); *H01R 13/502* (2013.01)

(58) Field of Classification Search
CPC ...... H01R 12/55; H01R 13/11; H01R 13/502; H01R 12/57; H01R 12/716; H01R 12/91; H01R 12/71; H01R 13/02; H01R 13/40
See application file for complete search history.

(56) References Cited

U.S. PATENT DOCUMENTS 9,172,172 B2 * 10/2015 Shindo .................. H01R 13/46
10,128,614 B2 * 11/2018 Suzuki .................. H01R 13/11
2014/0308839 A1 * 10/2014 Shindo .................. H01R 13/62 439/353
2014/0308851 A1 * 10/2014 Shindo .................. H01R 43/26 439/625
2015/0064975 A1 * 3/2015 Funayama ............. H01R 13/20 439/626
2018/0040983 A1 * 2/2018 Matsumoto ........ H01R 13/6315
2018/0241155 A1 * 8/2018 Suzuki ............... H01R 13/7032
2021/0111517 A1 * 4/2021 Tamaki .............. H01R 13/6315
2023/0246352 A1 * 8/2023 Shindo ................. H01R 12/716 439/83
2025/0055224 A1 * 2/2025 Shindo ................. H01R 13/506

FOREIGN PATENT DOCUMENTS

JP 2015-158990 A 9/2015

* cited by examiner

*Primary Examiner* — Abdullah A Riyami
*Assistant Examiner* — Nader J Alhawamdeh
(74) *Attorney, Agent, or Firm* — Kratz, Quintos & Hanson, LLP

(57) ABSTRACT

A connector of the present invention includes a fixed housing, a movable housing, a plurality of terminals, and a metal movement restricting member to be attached to the fixed housing. The movable housing includes a main body portion for insertion in a loose fit state into an insertion hole of the fixed housing, and a protrusion portion projecting from the main body portion. In the state where the main body portion has been inserted into the insertion hole, the protrusion portion projects from the main body portion along a perpendicular direction that is perpendicular to both the insertion direction and the width direction. When the main body portion becomes displaced in a direction opposite to the insertion direction, the movement restricting member restricts the amount of displacement of the movable housing by abutting against the protrusion portion.

6 Claims, 18 Drawing Sheets

CONNECTOR

CROSS-REFERENCE TO RELATED APPLICATION

This application claims priority to Japanese Patent Application No. 2022-004272. The entire disclosure of Japanese Patent Application No. 2022-004272 is hereby incorporated herein by reference.

BACKGROUND OF THE INVENTION

1. Field of the Invention

The present invention relates to a connector that includes a fixed housing to be disposed on a substrate, a movable housing mounted so as to be displaceable relative to the fixed housing, and a plurality of terminals that are for electrical connection to partner connection members and support the movable housing so as to be displaceable relative to the fixed housing.

2. Description of Related Art

Conventionally, connectors have been used to connect a substrate to a partner connection member such as a terminal. One known example of such a connector is a connector that includes a fixed housing to be disposed on a substrate, a movable housing mounted so as to be displaceable relative to the fixed housing, and a plurality of terminals that are for electrical connection to partner connection members and support the movable housing so as to be displaceable relative to the fixed housing. In such a connector, positional deviation between the substrate and the partner connection members can be absorbed due to the movable housing being supported so as to be displaceable relative to the fixed housing. For example, even if vibration occurs on the substrate side while the partner connection members are connected to the substrate via the connector, the vibration occurring in the substrate can be absorbed between the substrate and the partner connection members by the terminals, and the transmission of vibration to the partner connection members can be suppressed. The connector disclosed in JP 2015-158990A is one known example of such a connector.

A receptacle connector 1 disclosed in JP 2015-158990A is configured as a floating connector, and includes a fixed housing 10 disposed on a substrate 2, a movable housing 20, a plurality of receptacle contacts 30 serving as terminals, and a pair of receptacle-side fixing fittings 50. The fixed housing 10 includes a fixed-side main body portion 11 to which the receptacle contacts 30 are attached side by side with each other, and a pair of fixed-side movement restricting portions 15 provided as the two end portions of the fixed-side main body portion 11. The pair of fixed-side movement restricting portions 15 are provided at respective end portions of the fixed housing 10 in the width direction, which is the pitch direction in which the receptacle contacts 30 are aligned, and are each provided with a receiving space 15*a* formed as a U-shaped recession that is open upwards. The movable housing 20 is provided with a movable-side main body portion 21 to which the receptacle contacts 30 are attached, and a pair of movable-side movement restricting portions 25 formed at the two widthwise end portions of the movable-side main body portion 21 so as to protrude outward in the width direction.

Also, the base-side portions of the receptacle contacts 30 in the receptacle connector 1 are attached to the fixed housing 10, and the tip-side portions are attached to the movable housing 20. Accordingly, the fixed housing 10 and the movable housing 20 are coupled via the receptacle contacts 30. The receptacle connector 1 is configured such that the movable housing 20 can be displaced relative to the fixed housing 10 by elastic deformation of intermediate portions of the receptacle contacts 30, which are portions between the tip-side portion and the base-side portion. The pair of receptacle-side fixing fittings 50 in the receptacle connector 1 are respectively attached to the fixed-side movement restricting portions 15 at the two widthwise end portions of the fixed housing 10, and are fixed to the substrate 2.

When assembling the receptacle connector 1 of JP 2015-158990A, the receptacle contacts 30 are attached to the fixed housing 10 and the movable housing 20. Accordingly, the movable housing 20 is supported via the receptacle contacts 30 so as to be displaceable relative to the fixed housing 10. Also, when attaching the receptacle contacts 30 to the fixed housing 10 and the movable housing 20, the movable housing is mounted to the fixed housing 10 in the state where the movable-side movement restricting portions 25, which project in the width direction from the two widthwise end portions of the movable housing 20, have been inserted into the receiving spaces 15*a* provided in the fixed-side movement restricting portions 15 at the two widthwise end portions of the fixed housing 10. In this state, the pair of receptacle-side fixing fittings 50 are attached to the fixed-side movement restricting portions 15 at the two widthwise end portions of the fixed housing 10 so as to cover the receiving spaces 15*a* from above, and are fixed to the substrate 2. Accordingly, the receptacle connector 1 has a configuration in which, when the movable housing 20 becomes displaced relative to the fixed housing 10, the movable-side movement restricting portions 25 abut against the fixed-side movement restricting portions 15 and the receptacle-side fixing fittings 50, thus restricting the amount of displacement of the movable housing 20 relative to the fixed housing 10. By restricting the amount of displacement of the movable housing 20 relative to the fixed housing 10, it is possible to prevent excessive deformation of the receptacle contacts 30.

SUMMARY OF THE INVENTION

In the receptacle connector 1 disclosed in JP 2015-158990A, the movable-side movement restricting portions 25, which project in the width direction at the two widthwise end portions of the movable housing 20, are inserted into the receiving spaces 15*a* provided in the fixed-side movement restricting portions 15 at the two widthwise end portions of the fixed housing 10. The pair of receptacle-side fixing fittings 50 are attached to the fixed-side movement restricting portions 15 at the two widthwise end portions of the fixed housing 10 so as to cover the receiving spaces 15*a* from above. Accordingly, in the receptacle connector 1 in which the movable housing is displaceable relative to the fixed housing 10, the amount of displacement of the movable housing 20 relative to the fixed housing 10 can be restricted.

However, in the receptacle connector 1 disclosed in JP 2015-158990A, the fixed-side movement restricting portions 15 and the receptacle-side fixing fittings 50, which are the elements that abut against the movable housing 20 in order to restrict the amount of displacement of the movable housing 20 relative to the fixed housing 10, are provided at the two widthwise end portions of the fixed housing 10. Also, the movable-side movement restricting portions 25, which are the elements of the movable housing 20 that abut against the fixed housing 10 and the receptacle-side fixing fittings 50, are also provided so as to project in the width direction at the two widthwise end portions of the movable housing 20. For this reason, the receptacle connector 1 of JP 2015-158990A has a problem of being large in the width direction, which is the pitch direction in which the receptacle contacts 30 (terminals) are aligned.

In view of the above circumstances, an object of the present invention is to provide a connector that has a configuration in which a movable housing is displaceable relative to a fixed housing, and that furthermore enables restricting the amount of displacement of the movable housing relative to the fixed housing and suppressing an increase in the size of the connector in the width direction, which is the pitch direction in which terminals are aligned.

(1) A connector according to an aspect of the present invention for achieving the aforementioned object is a connector including: a fixed housing configured to be disposed on a substrate; a movable housing configured to be mounted so as to be displaceable relative to the fixed housing; and a plurality of terminals configured to be electrically connected to partner connection members and support the movable housing so as to be displaceable relative to the fixed housing. In the above aspect of the present invention, the connector further includes a movement restricting member made of a metal and configured to be attached to the fixed housing in a state where the movable housing has been inserted into the fixed housing, the movable housing includes: a main body portion configured to be inserted in a loose-fit state into an insertion hole formed in the fixed housing; and a protrusion portion projecting from the main body portion, in a state in which the main body portion has been inserted into the insertion hole, the protrusion portion projects from the main body portion along a perpendicular direction that is perpendicular to both an insertion direction in which the main body portion is inserted into the insertion hole and a width direction in which the plurality of terminals are arranged side by side in the fixed housing, and the movement restricting member is further configured to restrict an amount of displacement of the movable housing relative to the fixed housing by abutting against the protrusion portion when the main body portion has been inserted into the insertion hole and becomes displaced relative to the fixed housing in a direction opposite to the insertion direction.

According to this configuration, the connector is configured such that the movable housing can be displaced relative to the fixed housing due to the movable housing being supported by the fixed housing via the terminals. Also, according to the above configuration, in the state where the main body portion of the movable housing has been inserted in a loose-fit state into the insertion hole of the fixed housing, the protrusion portion projecting from the main body portion is able to abut against the movement restricting member, which is made of metal and attached to the fixed housing. If the main body portion becomes displaced in the direction opposite to the insertion direction, which is the direction of being removed from the fixed housing, the protrusion portion of the movable housing and the movement restricting member abut against each other, thus restricting the amount of displacement of the movable housing relative to the fixed housing. For this reason, according to the above configuration, the amount of displacement of the movable housing relative to the fixed housing can be restricted, and it is possible to prevent the terminals from being excessively deformed and damaged. Also, according to the above configuration, the protrusion portion of the movable housing, which abuts against the movement restricting member that restricts the amount of displacement of the movable housing, projects in the perpendicular direction, which is perpendicular to both the width direction, which is the pitch direction in which the terminals are arranged side by side, and the insertion direction of the movable housing. For this reason, an increase in the size of the movable housing in the width direction is suppressed. Furthermore, due to the movement restricting member, which abuts against the protrusion portion of the movable housing to restrict the amount of displacement of the movable housing, being provided as a member attached to the fixed housing, an increase in the size of the fixed housing in the width direction is also suppressed. Accordingly, an increase in the size of the connector is suppressed.

Therefore, according to the above configuration, in the connector configured such that the movable housing can be displaced relative to the fixed housing, the amount of displacement of the movable housing relative to the fixed housing can be restricted, and it is possible to suppress an increase in the size of the connector in the width direction, which is the pitch direction in which the terminals are arranged side by side.

(2) A configuration is possible in which each of the plurality of terminals includes: a substrate connection portion configured to be connected to the substrate; a fixing portion configured to be attached and fixed to the fixed housing; a partner connection portion configured to be held by the movable housing and connected to a corresponding partner connection member among the plurality of partner connection members; and a movable spring portion integrally coupling the fixing portion and the partner connection portion and configured to support the partner connection portion so as to be displaceable relative to the fixing portion, and in a state where the main body portion has been inserted into the insertion hole, the protrusion portion projects from the main body portion toward a side in the perpendicular direction on which the fixing portions are fixed in the fixed housing.

According to this configuration, each of the terminals includes the substrate connection portion that is to be connected to the substrate, the fixing portion that is to be fixed to the fixed housing, and the partner connection portion that is on the side of the movable spring portion opposite to the fixing portion and is to be connected to the corresponding partner connection member among the partner connection members.

For this reason, the terminals, which support the movable housing so as to be displaceable relative to the fixed housing, each have a simple structure in which the substrate connection portion, the fixing portion, the movable spring portion, and the partner connection portion are coupled to each other as an integrated body. Also, in the above configuration, the partner connection portions of the terminals are held in the main body portion of the movable housing. Moreover, in the above configuration, the protrusion portion projecting from the main body portion of the movable housing projects toward the side on which the fixing portions of the terminals are fixed, in the direction perpendicular to the width direction and the insertion direction in the fixed housing. For this reason, the protrusion portion is arranged in a state of projecting from the side corresponding to the insertion hole, which receives insertion of the main body portion of the movable housing that holds the partner connection portions of the terminals, toward the side on which the fixing portions of the terminals are fixed, in the fixed housing. Accordingly, in the fixed housing, the space on the side where the fixing portions of the terminals are fixed can be efficiently used to dispose the protrusion portion. For this reason, it is possible to prevent an increase in the size of the connector in which the protrusion portion of the movable housing projects in the fixed housing toward the side opposite to the side on which the fixing portions are fixed, and it is possible to further suppress an increase in the size of the connector in the direction perpendicular to the width direction and the insertion direction.

(3) A configuration is possible in which the movement restricting member includes: a plate-shaped portion extending with a plate-like shape along the width direction relative to the fixed housing; and a plurality of attachment portions respectively provided at two end portions of the plate-shaped portion in the width direction and configured to be attached to the fixed housing, and in a state where the main body portion has been inserted into the insertion hole, the protrusion portion projects from the main body portion along the perpendicular direction and extends along the width direction.

According to this configuration, displacement of the movable housing relative to the fixed housing is restricted by the plate-shaped portion of the movement restricting member, which extends along the width direction of the fixed housing, abutting against the protrusion portion of the movable housing, which extends in the width direction of the fixed housing and projects in the direction perpendicular to the width direction and the insertion direction. For this reason, the movement restricting member and the protrusion portion of the movable housing can abut against each other over a wide area in the width direction of the fixed housing. Accordingly, a wide area of abutment between the plate-shaped portion and the protrusion portion can be ensured, and displacement of the movable housing relative to the fixed housing can be reliably and stably restricted.

(4) A configuration is possible in which the attachment portions are attached by being press-fitted to inward sides of the fixed housing in the width direction.

According to this configuration, the attachment portions of the movement restricting member are attached by being press-fitted into the fixed housing, and therefore the movement restricting member, which is made of metal, can be easily and firmly fixed and attached to the fixed housing. Also, since the attachment portions of the movement restricting member are press-fitted to inward sides of the fixed housing in the width direction, the movement restricting member can be prevented from being attached to the fixed housing in a state of projecting from the fixed housing in the width direction. Accordingly, it is possible to prevent an increase in the size of the connector in the width direction caused if the movement restricting member extends outward in the width direction.

(5) A configuration is possible in which the insertion hole restricts an amount of displacement of the main body portion of the movable housing relative to the fixed housing in both the width direction and the perpendicular direction.

According to this configuration, when the main body portion of the movable housing is inserted into the insertion hole of the fixed housing, the amount of displacement of the fixed housing in the width direction and the perpendicular direction is restricted. For this reason, with a simple configuration in which the main body portion of the movable housing is inserted into the insertion hole of the fixed housing, it is possible to restrict the amount of displacement of the movable housing relative to the fixed housing in the width direction and the perpendicular direction.

(6) A configuration is possible in which the movement restricting member is provided with a flat surface constituting a suction surface that is suctioned when the connector is suctioned and transported.

When the connector is to be mounted on the substrate, the connector is suctioned and transported. According to the above configuration, the movement restricting member includes the suction surface that is suctioned during suctioning and transport of the connector. For this reason, in the connector, the movement restricting member, which is made of metal and restricts the amount of displacement of the movable housing relative to the fixed housing, can also be used as the suction surface for the suctioning and transport of the connector. Also, according to the above configuration, the suction surface is provided in the movement restricting member that is attached to the fixed housing, and therefore when the connector is suctioned and transported, the connector can be transported by suctioning the fixed housing, which is disposed on the substrate, rather than suctioning the movable housing that can be displaced relative to the fixed housing. For this reason, the connector can be mounted on the substrate in a stable state in which the position of the fixed housing does not shift relative to the substrate. Also, according to the above configuration, the suction surface is provided in the movement restricting member, thus eliminating the need to provide space for forming a separate suction surface in the fixed housing, and making it possible to further suppress an increase in the size of the fixed housing.

The above and other objects, features, and advantages of the present invention will become apparent from reading the following description together with the accompanying drawings.

DETAILED DESCRIPTION OF THE INVENTION

Hereinafter, embodiments for carrying out the present invention will be described with references to the drawings. The present invention is broadly applicable to various applications as a connector that includes a fixed housing to be disposed on a substrate, a movable housing mounted so as to be displaceable relative to the fixed housing, and a plurality of terminals that are for electrical connection to partner connection members and support the movable housing so as to be displaceable relative to the fixed housing.

Overview of Configuration of Connector

Figure 1:
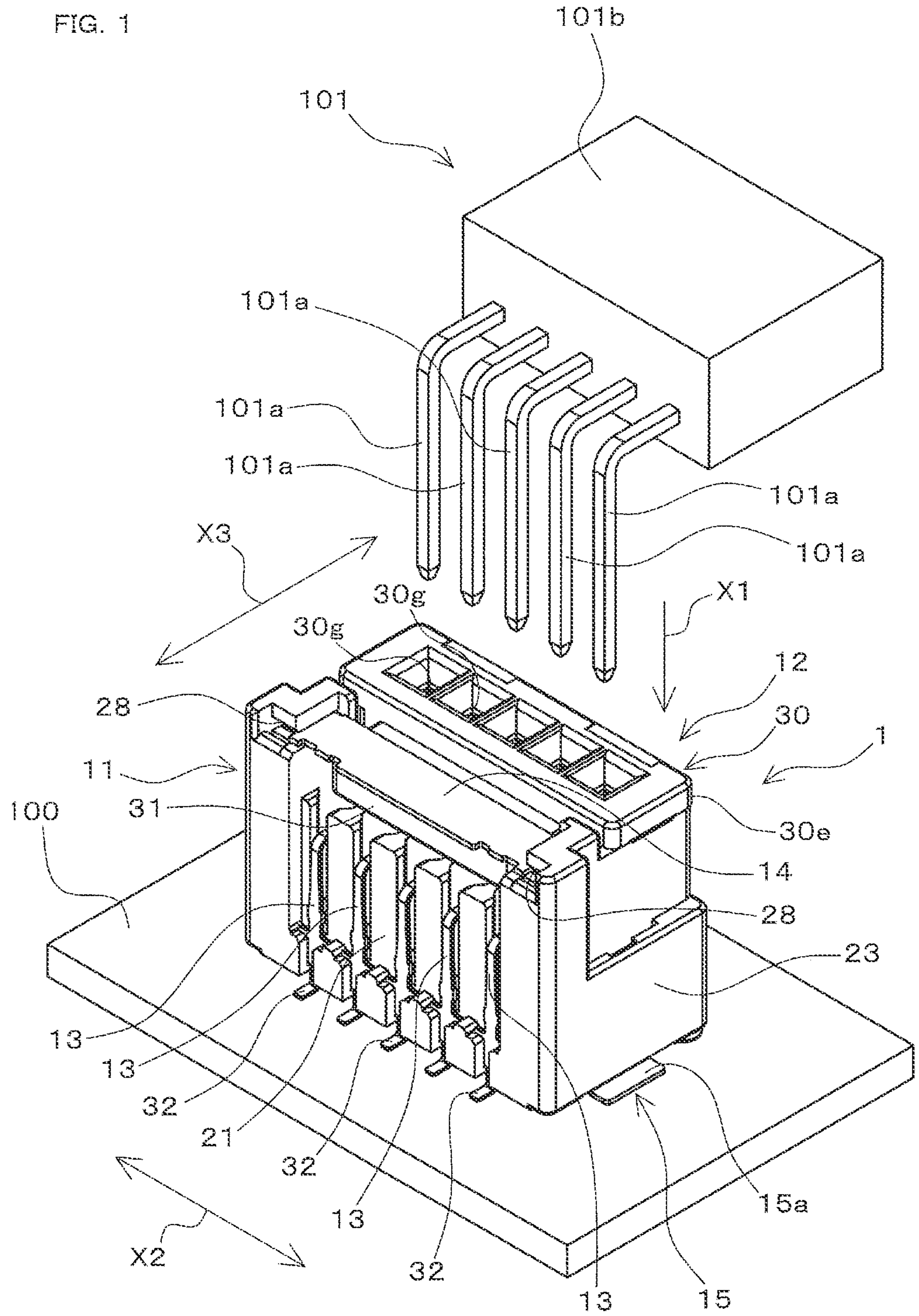
FIG. 1 is a perspective view showing a connector according to an embodiment of the present invention, along with a substrate and a partner connector.
Figure 2:
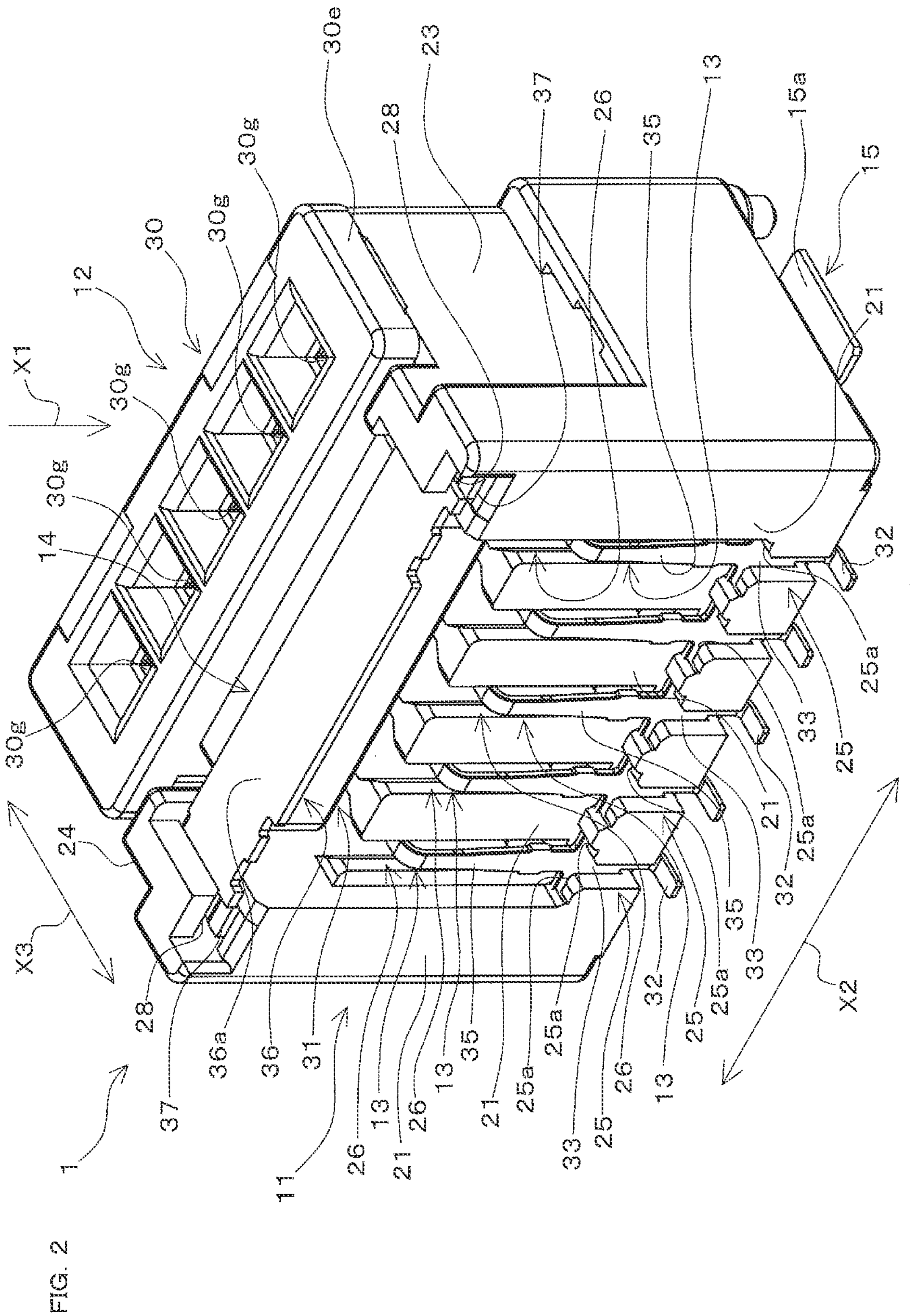
FIG. 2 is a perspective view showing the connector.
Figure 3A:
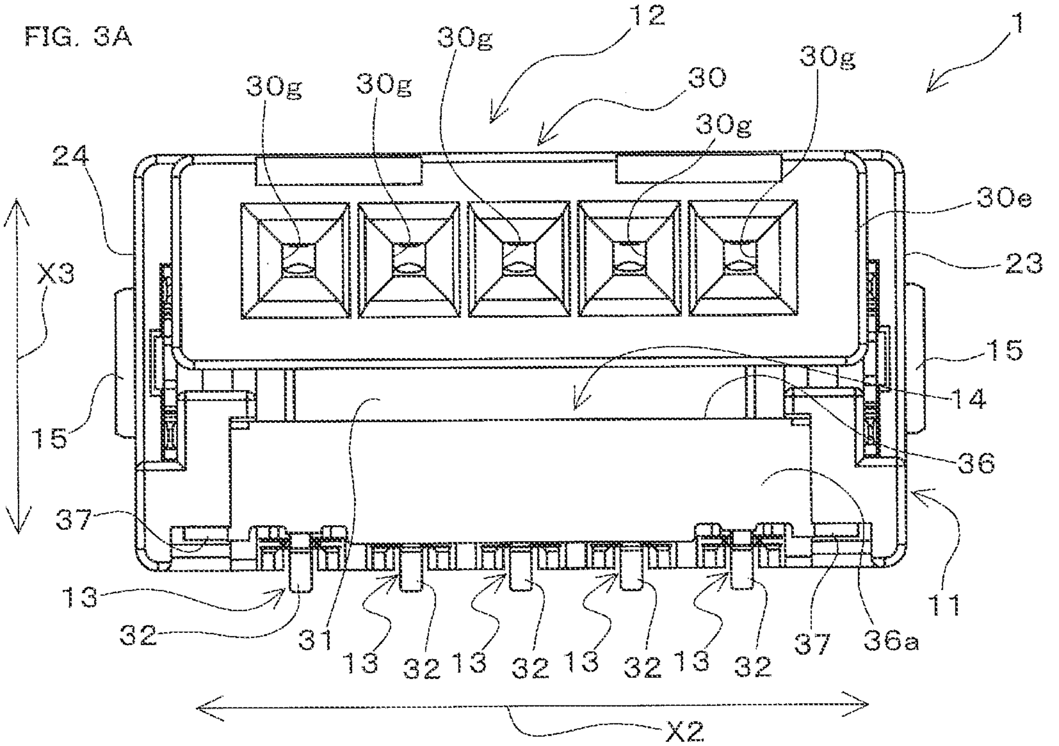
FIG. 3A is a plan view of the connector.
Figure 3B:
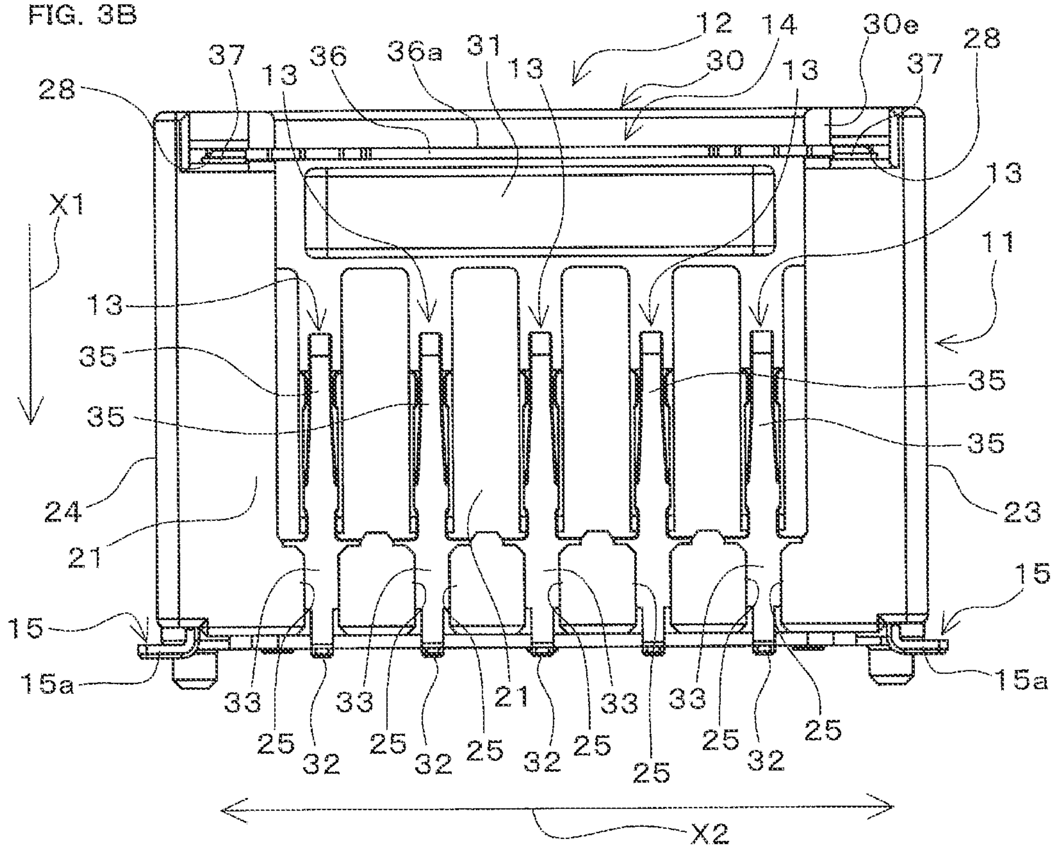
FIG. 3B is a front view of the connector.
Figure 4:
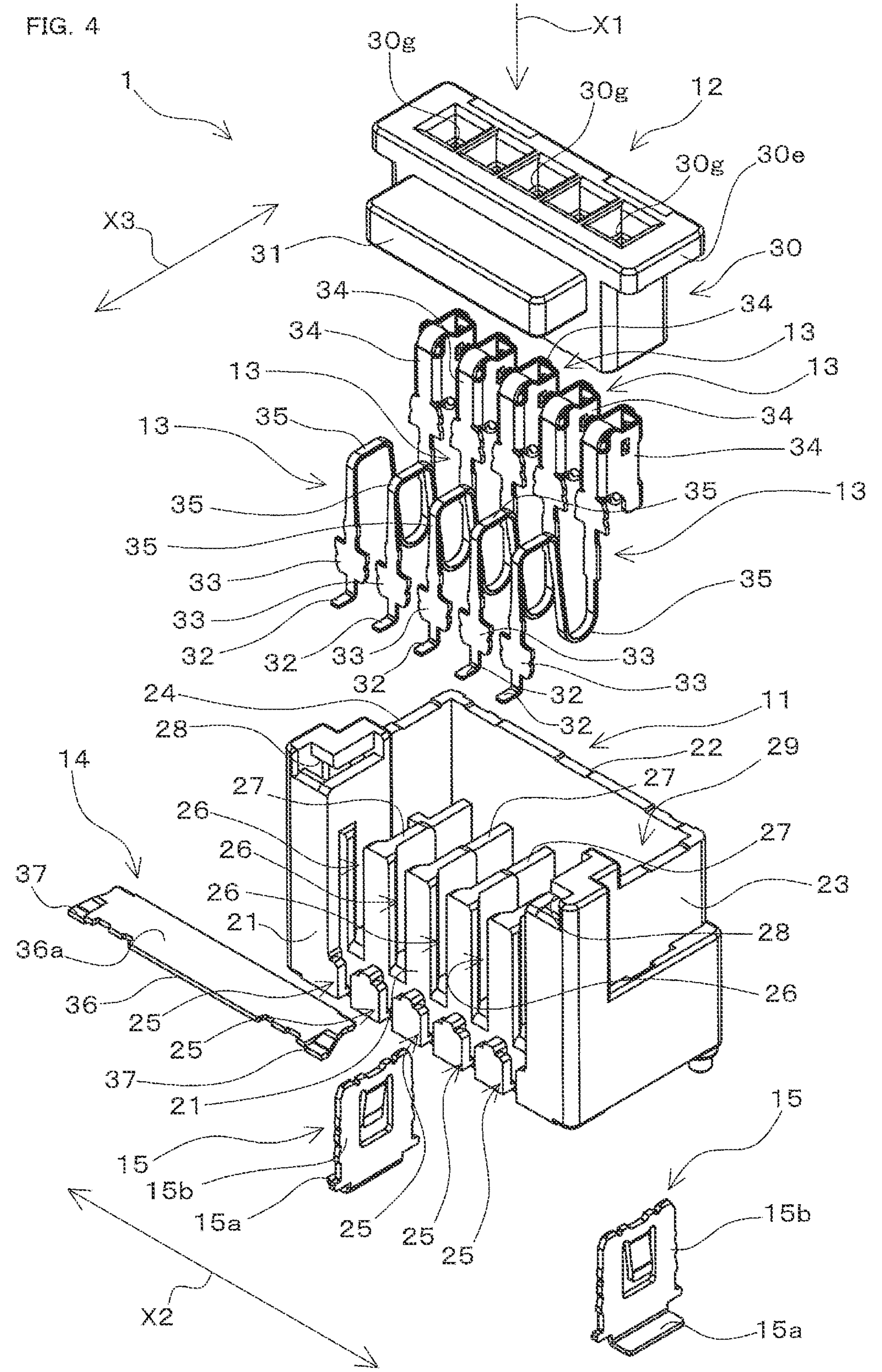
FIG. 4 is an exploded perspective view of the connector.
Figure 5B:
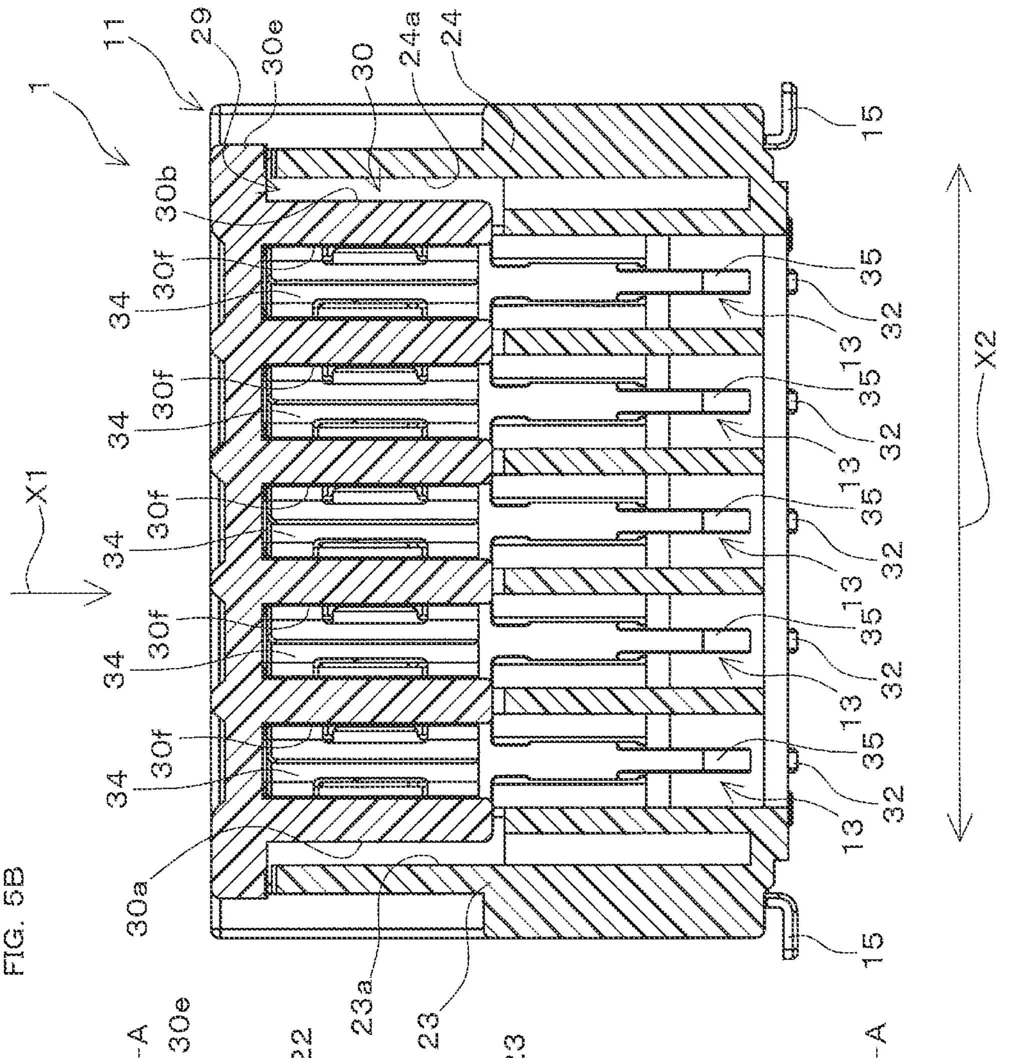
FIG. 5B is a cross-sectional view of the connector taken along line A-Ain FIG. 5A
Figure 5A:
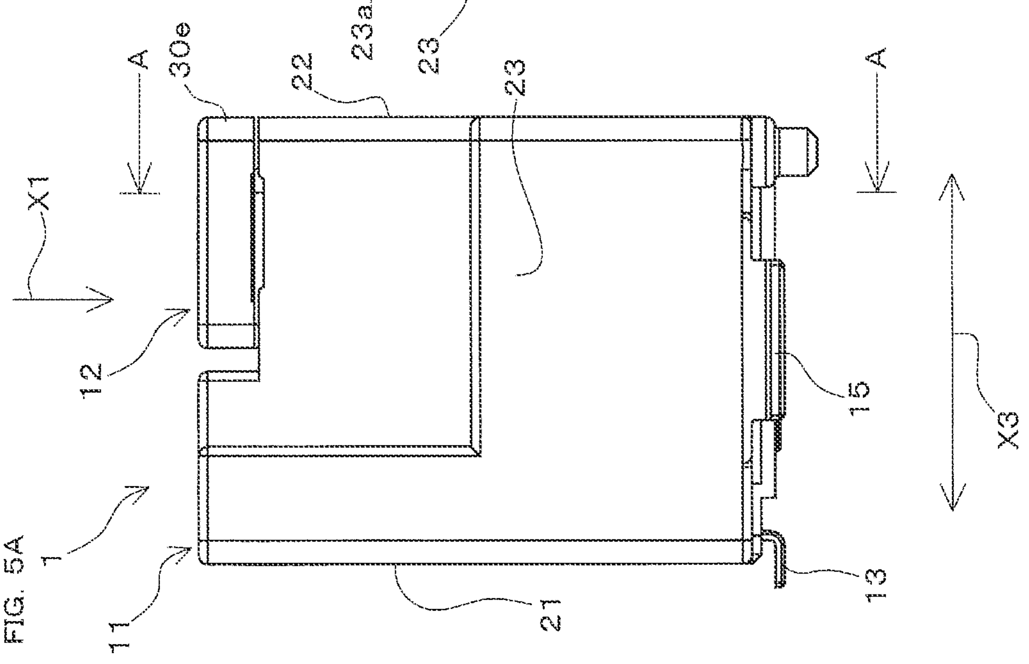
FIG. 5A is a side view of the connector.
Figure 6B:
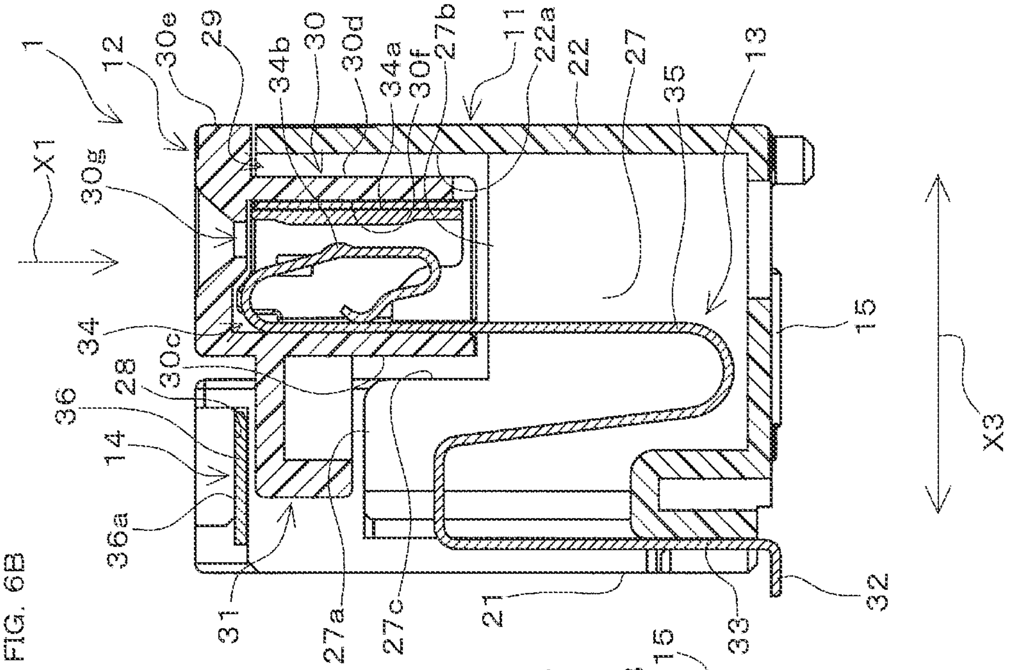
FIG. 6B is a cross-sectional view of the connector taken along line B-B in FIG. 6A.
Figure 6A:
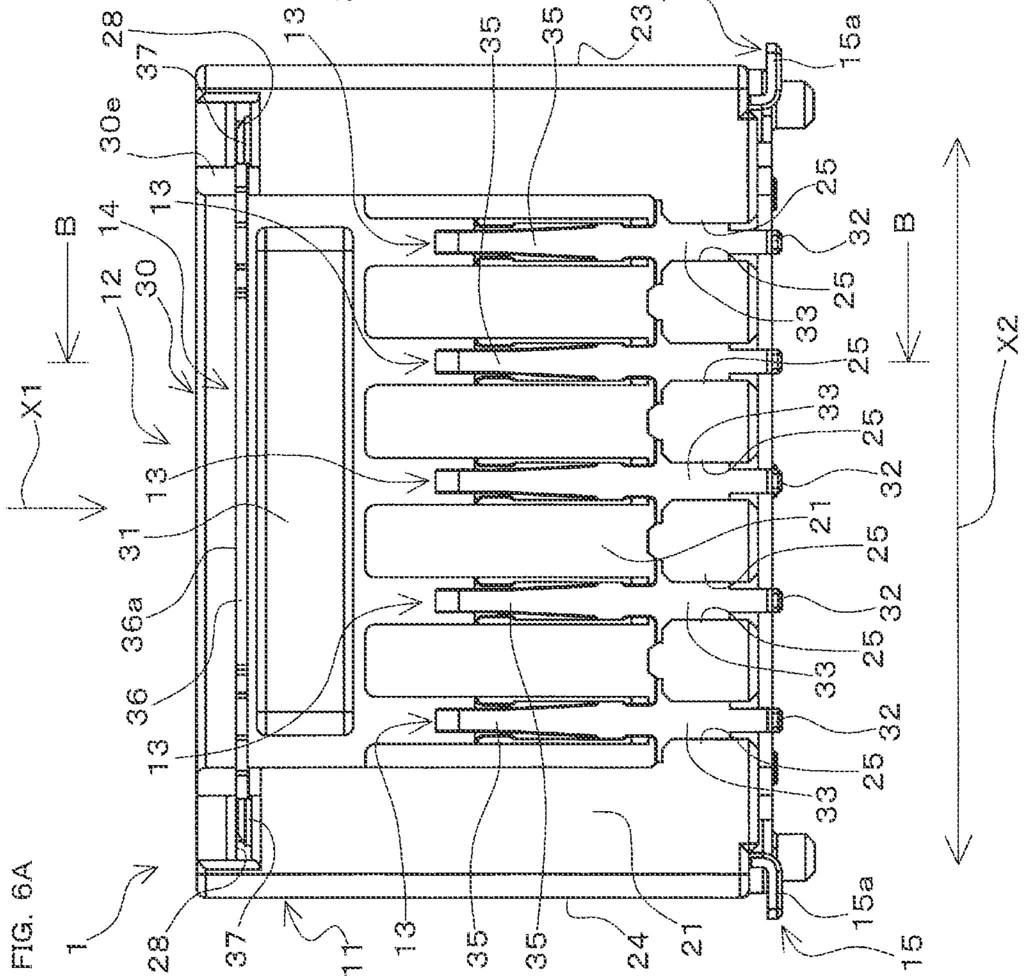
FIG. 6A is a front view of the connector.
Figure 7:
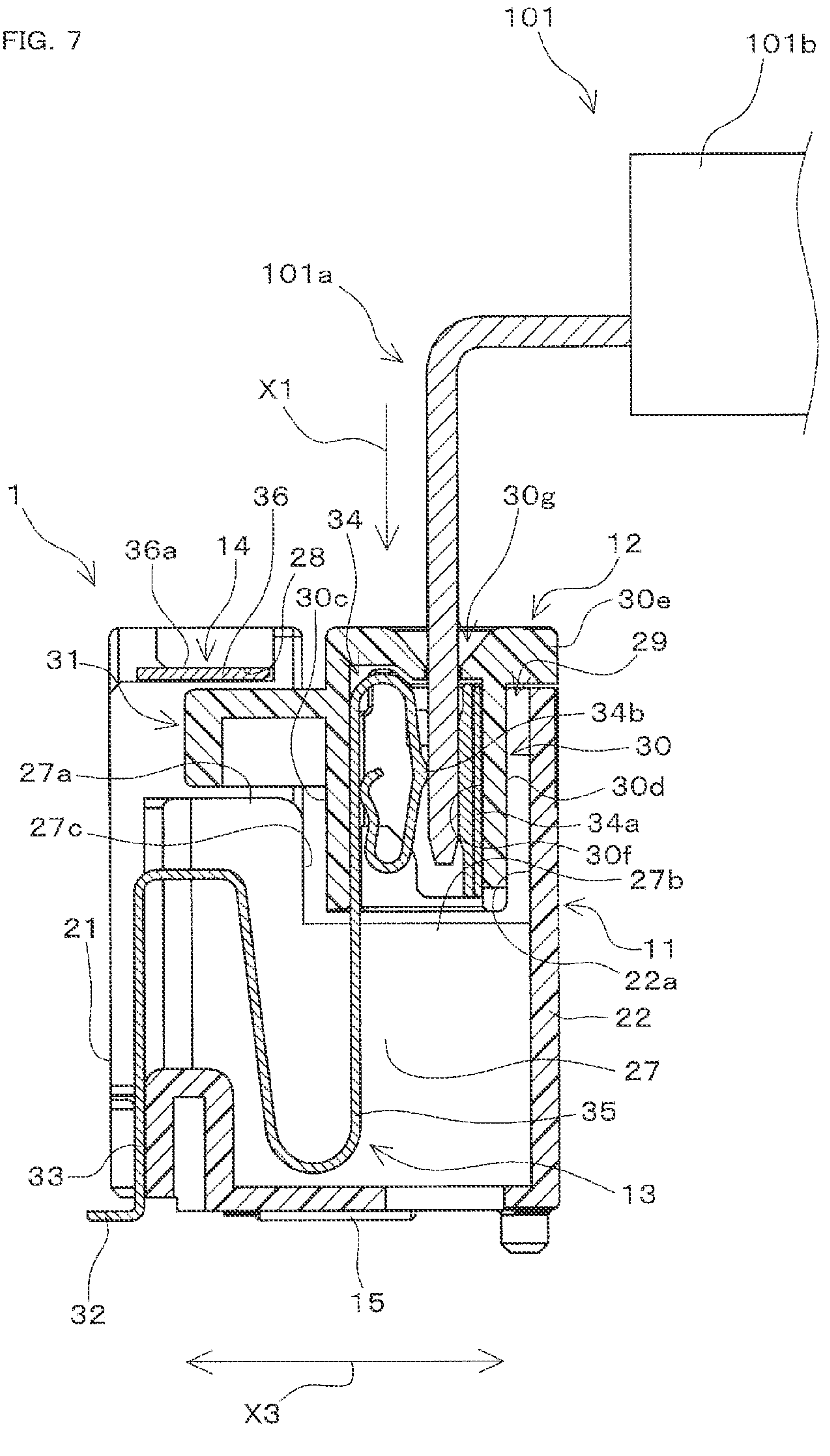
FIG. 7 is a cross-sectional view showing a state in which the connector and the partner connector are connected.

FIG. 1 is a perspective view showing a connector 1 according to an embodiment of the present invention, along with a substrate 100 and a partner connector 101. Note that FIG. 1 shows a state in which the connector 1 is disposed on the substrate 100 and is electrically connected to the substrate 100, and the partner connector 101 is not connected to the connector 1. FIG. 2 is a perspective view showing the connector 1. FIG. 3A is a plan view of the connector 1, and FIG. 3B is a front view of the connector 1. FIG. 4 is an exploded perspective view of the connector 1. FIG. 5A is a side view of the connector 1, and FIG. 5B is a cross-sectional view of the connector 1 taken along line A-A in FIG. 5A. FIG. 6A is a front view of the connector 1, and FIG. 6B is a cross-sectional view of the connector 1 taken along line B-B in FIG. 6A. FIG. 7 is a diagram showing a state in which the connector 1 and the partner connector 101 are connected. Note that FIG. 7 shows a cross-sectional view of the connector 1, but only a portion of the partner connector 101 is shown in cross-section.

The connector 1 shown in FIGS. 1 to 7 includes a fixed housing 11, a movable housing 12, a plurality of terminals 13, a metal movement restricting member 14, and a pair of fixing fittings 15. The fixed housing 11 and the movable housing 12 are made of an insulating resin material. The terminals 13 are made of an electrically conductive metal material. The movement restricting member 14 and the pair of fixing fittings 15 are made of a metal material.

The connector 1 is configured to be disposed and mounted on the substrate 100 so as to be mechanically and electrically connected to the substrate 100. Note that when connecting the connector 1 to the substrate 100, the terminals 13 of the connector 1 are soldered to the substrate 100, and the pair of fixing fittings 15 of the connector 1 are also soldered to the substrate 100. Also, the connector 1 is configured to be mechanically and electrically connected to the partner connector 101 in the state where the connector 1 is disposed on the substrate 100. When the connector 1, which is disposed on the substrate 100, is connected to the partner connector 101, the substrate 100 and the partner connector 101 are electrically connected via the connector 1.

In FIG. 1, only a portion of the substrate 100, on which the connector 1 is disposed, is schematically illustrated, and more specifically, only the portion on which the connector 1 is disposed and the vicinity thereof are illustrated. The substrate 100 on which the connector 1 is disposed is configured as a substrate having a conductive circuit pattern provided on the upper surface. The conductive circuit pattern on the substrate 100 is not shown in FIG. 1. The substrate 100 is used as a substrate provided in an in-vehicle device (not shown), for example.

The partner connector 101 to which the connector 1 is connected includes a plurality of partner terminals 101*a* and a partner housing 101*b* that holds the partner terminals 101*a*. Note that only a portion of the partner housing 101*b* is shown in FIG. 1. The partner connector 101 is connected to a power supply unit (not shown) that supplies power to an in-vehicle device provided with the substrate 100, for example.

The partner terminals 101*a* of the partner connector 101 are made of an electrically conductive metal material and provided as pin-shaped male terminals. The partner terminals 101*a* constitute partner connection members that are electrically connected to the terminals 13 of the connector 1. When connecting the partner connector 101 to the connector 1, the partner terminals 101*a* of the partner connector 101 are inserted into the movable housing 12 of the connector 1. The partner terminals 101*a* inserted into the movable housing 12 respectively come into contact with the terminals 13 of the connector 1 and are electrically connected thereto.

In the present embodiment, an aspect is illustrated in which the partner connection members electrically connected to the terminals 13 are configured as the pin-shaped partner terminals 101*a*, but the present invention is not limited to this. The terminals 13 may be configured to be electrically connected to partner connection members provided as terminals having a shape different from that of the pin-shaped partner terminals 101*a*.

The following describes the configuration of the connector 1 in more detail. In the following description, for convenience in the description, an insertion direction X1, a width direction X2, and a perpendicular direction X3 of the connector 1 are defined as respectively illustrated by an arrow X1, a double-headed arrow X2, and a double-headed arrow X3 in FIGS. 1 and 7 and the later-described figures. In the connector 1, the insertion direction X1 is the direction in which a later-described main body portion 30 of the movable housing 12 is inserted into the fixed housing 11. The insertion direction X1 is also the direction in which the partner terminals 101*a* of the partner connector 101 are inserted into the movable housing 12 and connected. Also, in the present embodiment, the insertion direction X1 is perpendicular to the upper surface of the substrate 100 that spreads in a flat manner when the connector 1 is disposed on the substrate 100. The width direction X2 is the pitch direction in which the terminals 13 are arranged side by side in a row in the fixed housing 11. The width direction X2 is perpendicular to the insertion direction X1, and is parallel with the upper surface of the substrate 100 that spreads in a flat manner. The perpendicular direction X3 is perpendicular to both the insertion direction X1 and the width direction X2. In other words, the perpendicular direction X3 is perpendicular to the insertion direction X1, and is also perpendicular to the width direction X3. Furthermore, in the present embodiment, the perpendicular direction X3 extends parallel with the upper surface of the substrate 100 that spreads in a flat manner.

Fixed Housing

Figure 8:
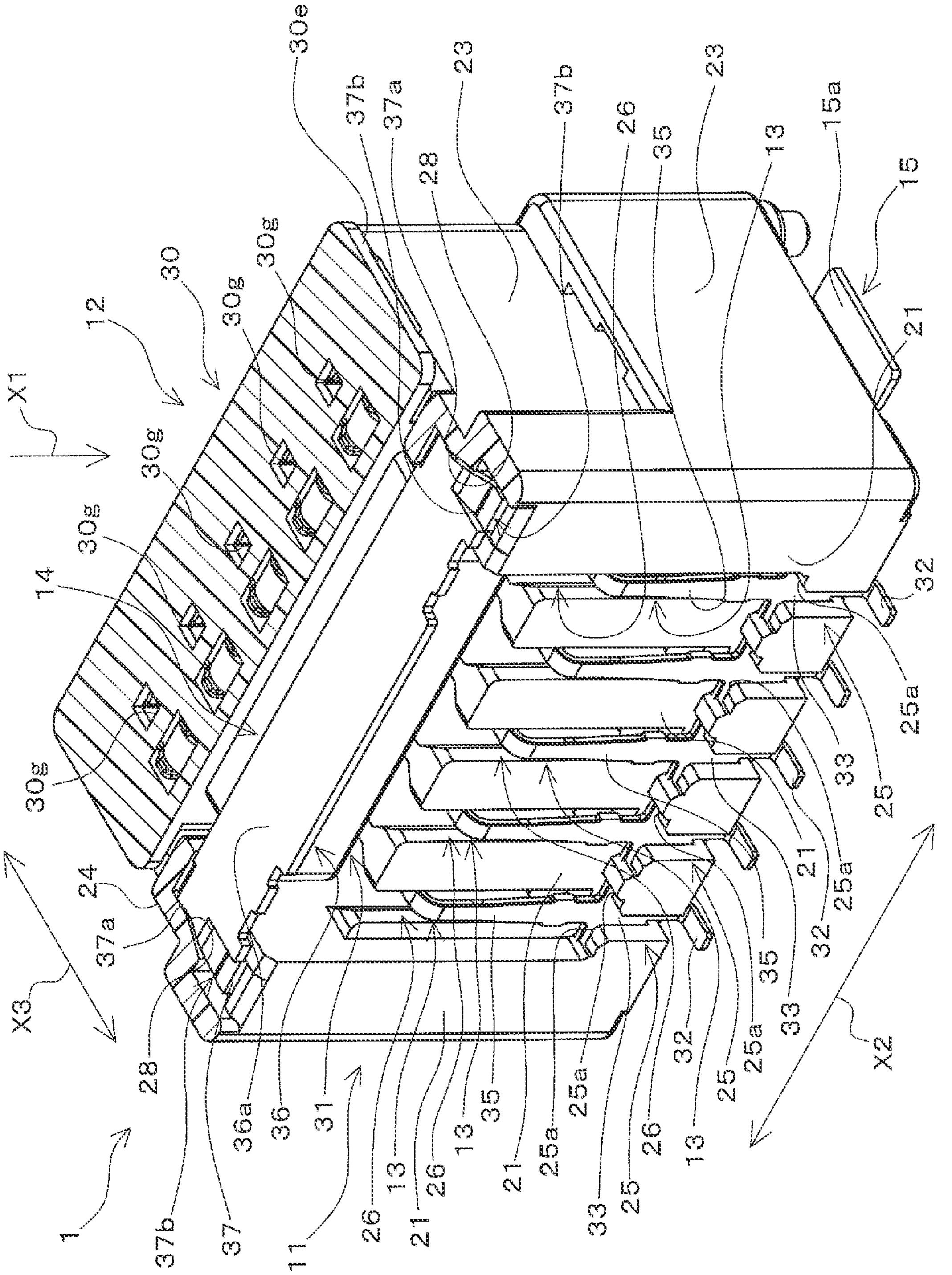
FIG. 8 is a perspective view of the connector, including a cross-section of the connector taken along a plane perpendicular to the insertion direction in which a movable housing is inserted into a fixed housing.
Figure 9:
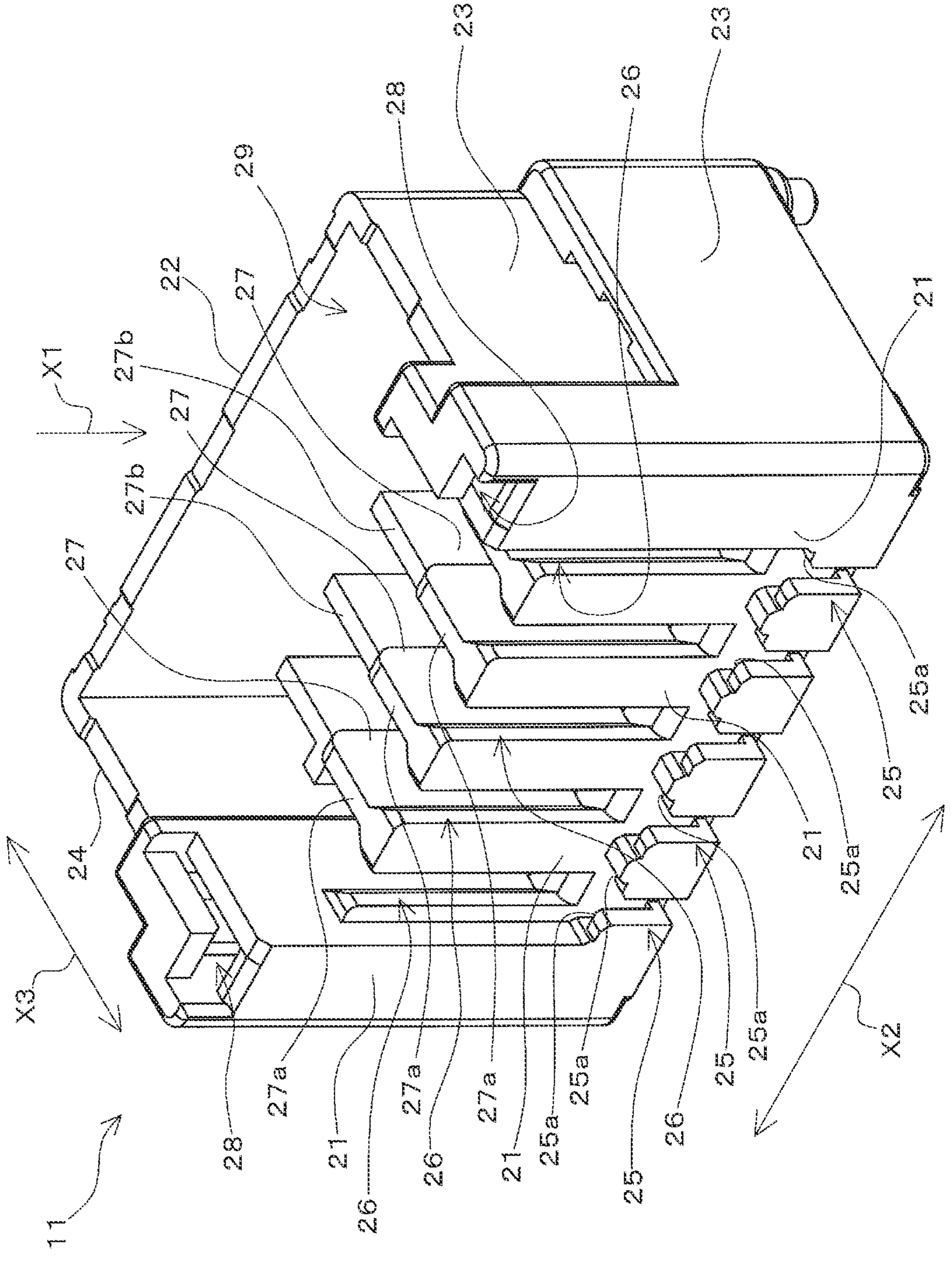
FIG. 9 is a perspective view showing the fixed housing of the connector.

FIG. 8 is a perspective view of the connector 1, including a cross-section taken along a plane perpendicular to the insertion direction X1 in which the movable housing 12 is inserted into the fixed housing 11 in the connector 1. FIG. 9 is a perspective view showing the fixed housing 11 of the connector 1. The fixed housing 11 shown in FIGS. 1 to 9 has a configuration in which the movable housing 12 is inserted therein and mounted thereto, and the fixed housing 11 holds the terminals 13. Furthermore, the fixed housing 11 is configured to be disposed on the substrate 100 via the terminals 13 and the pair of fixing fittings 15.

The fixed housing 11 includes a terminal holding wall 21 that holds the terminals 13, a rear wall 22 that faces the terminal holding wall 21, and a pair of side walls 23 and 24 that extend perpendicular to the terminal holding wall 21 and the rear wall 22. The terminal holding wall 21, the side wall 23, the rear wall 22, and the side wall 24 are arranged so as to form a rectangular cross-section in a plane perpendicular to the insertion direction X1, and are integrated with each other to constitute four outer peripheral surfaces of the fixed housing 11. Accordingly, the fixed housing 11 has a substantially rectangular parallelepiped basic outer shape.

The terminal holding wall 21 is provided as a wall portion on one end side of the fixed housing 11 in the perpendicular direction X3, and is configured to hold the terminals 13. The terminal holding wall 21 includes a plurality of terminal fixing portions 25 in which later-described fixing portions 33 of the terminals 13 are fixed by being press-fitted in the terminal fixing portions 25. The terminal fixing portions 25 are provided on the terminal holding wall 21 on one end portion side in the insertion direction X1, and are arranged side by side along the width direction X2. Each of the terminal fixing portions 25 includes a pair of press-fit grooves 25*a* into which the later-described fixing portions 33 of the terminals 13 are press-fitted. The press-fit grooves 25*a* are formed as slit-like recessed grooves extending along the insertion direction X1 and the width direction X2, and are configured such that the fixing portions 33 of the terminals 13 are inserted and press-fitted therein. By press-fitting the fixing portions 33 of the terminals 13 into the pairs of press-fit grooves 25*a* of the terminal fixing portions 25, the terminals 13 are held in a state of being fixed to the terminal holding wall 21.

Also, the terminal holding wall 21 includes a plurality of slits 26. The slits 26 are arranged in the terminal holding wall 21 side by side along the width direction X2, and provided at positions corresponding to the terminal fixing portions 25 in a direction parallel with the insertion direction X1. The slits 26 are provided so as to pass through the terminal holding wall 21 in a direction parallel with the perpendicular direction X3, and extend along a direction parallel with the insertion direction X1. A portion of a later-described movable spring portion 35 of a terminal 13 held by the terminal holding wall 21 is arranged in each of the slits 26.

As shown in FIGS. 4, 6B, 7 and 9, the fixed housing 11 is provided with a plurality of partition walls 27 that extend from the terminal holding wall 21 toward the inside of the fixed housing 11. The partition walls 27 are arranged side by side along the width direction X2 inside the fixed housing 11. The partition walls 27 are provided inside the fixed housing 11 so as to extend from the terminal holding wall 21 along a direction parallel with the perpendicular direction X3. The partition walls 27 are provided as inner walls that separate the terminals 13 arranged side by side along the width direction X2 inside the fixed housing 11. In other words, in the fixed housing 11, the partition walls 27 separate adjacent terminals 13 among the terminals 13 arranged side by side along the width direction X2.

As shown in FIGS. 6B, 7, and 9, each of the partition walls 27 is provided with a first wall portion 27*a* and a second wall portion 27*b* that have different lengths in a direction parallel with the insertion direction X1. The first wall portion 27*a* and the second wall portion 27*b* are integrated with each other, and in the present embodiment, the first wall portion 27*a* is provided as a portion of the partition wall 27 on one end side in the perpendicular direction X3, and the second wall portion 27*b* is provided as a portion of the partition wall 27 on the other end side in the perpendicular direction X3. The first wall portion 27*a* is provided as a wall portion having a longer length in a direction parallel with the insertion direction X1, and the second wall portion 27*b* is provided as a wall portion having a shorter length in the direction parallel with the insertion direction X1. For this reason, the partition walls 27 are formed so that the length in the direction parallel with the insertion direction X1 varies in a stepwise manner along the perpendicular direction X3, that is to say, the first wall portion 27*a* projects in a direction opposite to the insertion direction X1, and the second wall portion 27*b* is recessed in a stepwise manner along the insertion direction X1.

As shown in FIGS. 1 to 4 and 6 to 9, the fixed housing 11 includes a pair of attachment grooves 28 for attachment of the later-described movement restricting members 14. The pair of attachment grooves 28 are provided in end portions of the fixed housing 11 in the direction opposite to the insertion direction X1. The pair of attachment grooves 28 are respectively provided on the two end sides of the fixed housing 11 in the width direction X2.

One attachment groove 28 out of the pair of attachment grooves 28 is a slit-shaped groove that extends from the terminal holding wall 21 side toward the side wall 23, and is provided in the end portion of the fixed housing 11 in the direction opposite to the insertion direction X1, on one side in the width direction X2. The other attachment groove 28 out of the pair of attachment grooves 28 is a slit-shaped groove that extends from the terminal holding wall 21 side toward the side wall 24, and is provided in the end portion of the fixed housing 11 in the direction opposite to the insertion direction X1, on the other side in the width direction X2. Also, the pair of attachment grooves 28 are both grooves that open toward one side in the perpendicular direction X3 and open inward in the width direction X2. Attachment portions 37 at the two end portions, in the width direction X2, of the later-described movement restricting member 14 are attached by being press-fitted into the pair of attachment grooves 28.

As shown in FIGS. 4 to 7 and 9, the fixed housing 11 is provided with an insertion hole 29 into which the movable housing 12 is inserted in a loose-fit state. The insertion hole 29 is provided as a hole that exposes the inside of the fixed housing 11 to the outside, and is open in a direction opposite to the insertion direction X1. Also, the insertion hole 29 is provided as a region inside the fixed housing 11 surrounded by the first wall portions 27*a* of the partition walls 27 that project from the terminal holding wall 21 toward the inside of the fixed housing 11, the side wall 23, the rear wall 22, and the side wall 24.

As shown in FIGS. 1 to 8, the fixed housing 11 is configured such that the fixing fittings 15 are attached to the side wall 23 and the side wall 24. End portions of the side wall 23 and the side wall 24 on the insertion direction X1 side are provided with press-fit grooves into which the fixing fittings 15 are press-fitted. The fixing fittings 15 are attached to the side wall 23 and the side wall 24 by press-fitting the fixing fittings 15 into the press-fit grooves provided in the side wall 23 and the side wall 24. The fixing fittings 15 are each provided with a press-fit portion 15*b* that is press-fitted into the press-fit groove of the side wall 23 or the side wall 24, and a soldering portion 15*a* that is bent relative to the press-fit portion 15*b* and is fixed to the substrate 100 by soldering.

Movable Housing

Figure 10:
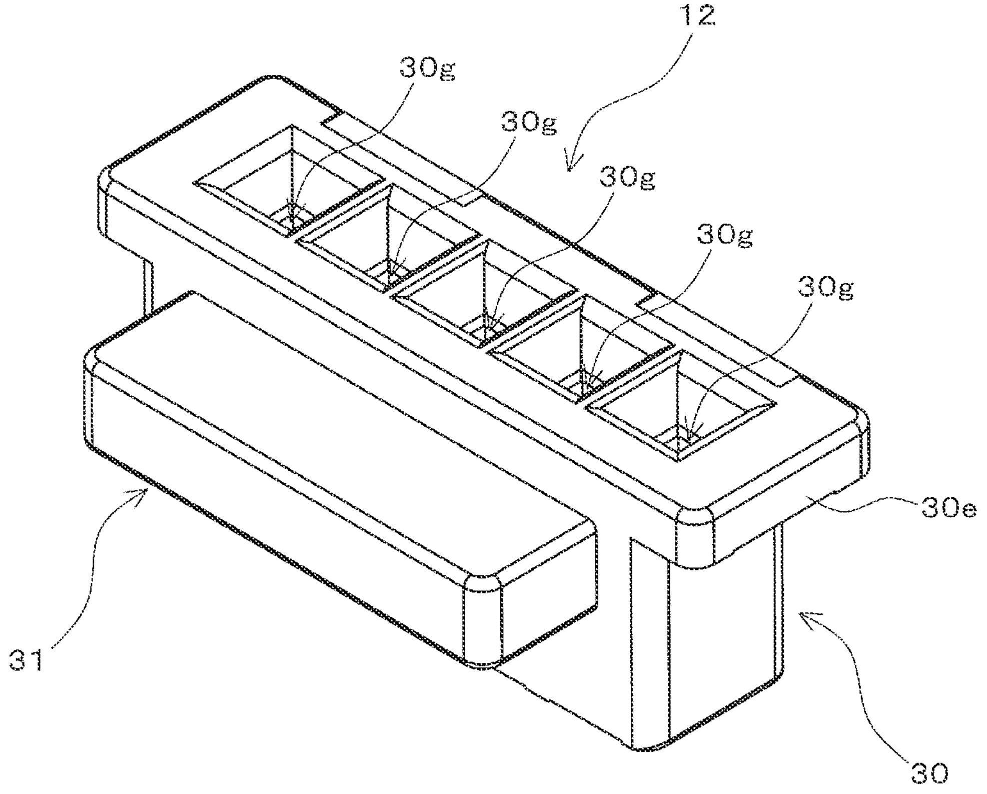
FIG. 10 is a perspective view showing the movable housing of the connector.

FIG. 10 is a perspective view showing the movable housing 12 of the connector 1. The movable housing 12 shown in FIGS. 1 to 8 and 10 is inserted in a loose-fit state into the insertion hole 29 of the fixed housing 11 and mounted so as to be displaceable relative to the fixed housing 11. Also, the movable housing 12 is supported by the terminals 13 so as to be displaceable relative to the fixed housing 11. The movable housing 12 includes a main body portion 30 that is inserted into the insertion hole 29 of the fixed housing 11, and a protrusion portion 31 that projects from the main body portion 30.

The main body portion 30 is formed as a member having a substantially rectangular parallelepiped basic outer shape elongated along the width direction X2, and is configured to be inserted in a loose fit state into the insertion hole 29 formed in the fixed housing 11. Since the main body portion 30 is inserted in a loose-fit state into the insertion hole 29 of the fixed housing 11, it is relatively displaceable inside the insertion hole 29. Note that when inserted into the insertion hole 29, the main body portion 30 is supported by the fixed housing 11 via the terminals 13.

Also, regarding cross-sections taken perpendicular to the insertion direction X1, a cross-section of the insertion hole 29, which is for insertion of the main body portion 30, has a larger cross-sectional area than a cross-section of the portion of the main body portion 30 that is inserted into the insertion hole 29. For this reason, after being inserted into the insertion hole 29, when the main body portion 30 becomes displaced in the width direction X2 and the perpendicular direction X3 in the insertion hole 29, the amount of displacement in the width direction X2 and the perpendicular direction X3 is restricted to a predetermined displacement amount or less. Accordingly, in the connector 1, the insertion hole 29 of the fixed housing 11 is provided so as to restrict the amount of displacement of the main body portion 30 of the movable housing 12 relative to the fixed housing 11 in both the width direction X2 and the perpendicular direction X3.

As shown in FIGS. 5A and 5B, when the main body portion 30 is inserted into the insertion hole 29 of the fixed housing 11 and supported by the fixed housing 11 via the terminals 13, the two end portions 30*a* and 30*b* of the main body portion 30 in the width direction X2 are separated by gaps from the pair of side walls 23 and 24. Specifically, a gap is formed between one end portion 30*a* of the main body portion 30 in the width direction X2 and an inward surface 23*a* of the side wall 23, and a gap is formed between the other end portion 30*b* of the main body portion 30 in the width direction X2 and an inward surface 24*a* of the side wall 24. If the main body portion becomes displaced to one side in the width direction X2, the end portion 30*a* of the main body portion 30 and the inner surface 23*a* of the side wall 23 abut against each other, and the amount of displacement of the main body portion 30 to the one side in the width direction X2 is restricted. Also, if the main body portion 30 becomes displaced to the other side in the width direction X2, the end portion 30*b* of the main body portion 30 and the inner surface 24*a* of the side wall 24 abut against each other, and the amount of displacement of the main body portion 30 to the other side in the width direction X2 is restricted. This therefore restricts the amount of displacement of the main body portion 30 inside the insertion hole 29 relative to the fixed housing 11 in the width direction X2. In other words, in the state where the main body portion has been inserted into the insertion hole 29, the amount of displacement of the movable housing 12 relative to the fixed housing 11 in the width direction X2 is restricted.

As shown in FIGS. 6 and 7, in the state where the main body portion 30 has been inserted into the insertion hole 29 of the fixed housing 11 and is supported by the fixed housing 11 via the terminals 13, two end portions 30*c* and 30*d* of the main body portion 30 in the perpendicular direction X3 are separated by gaps from the first wall portions 27*a* of the partition walls 27 and the rear wall 22. Note that the first wall portion 27*a* of each of the partition walls 27 is formed so as to be recessed stepwise in the insertion direction X1 at a portion continuous with the second wall portion 27*b*. Also, the first wall portion 27*a* has an edge portion 27*c* formed in the first wall portion 27*a* so as to be recessed stepwise toward the second wall portion 27*b* on the side opposite to the terminal holding wall 21 side, and the edge portion 27*c* faces the insertion hole 29 in the perpendicular direction X3. A gap is formed between the one end portion 30*c* of the main body portion 30 in the perpendicular direction X3 and the edge portions 27*c* of the first wall portions 27*a* of the partition walls 27. A gap is also formed between the other end portion 30*d* of the main body portion 30 in the perpendicular direction X3 and the inward surface 22*a* of the rear wall 22. If the main body portion 30 becomes displaced to the one side in the perpendicular direction X3, the end portion 30*c* of the main body portion 30 and the edge portion 27*c* of the first wall portion 27*a* of the partition walls 27 abut against each other, and the amount of displacement of the main body portion 30 to the one side in the perpendicular direction X3 is restricted. Also, if the main body portion 30 becomes displaced to the other side in the perpendicular direction X3, the end portion 30*d* of the main body portion 30 and inward surface 22*a* of the rear wall 22 abut against each other, and the amount of displacement of the main body portion 30 to the other side in the perpendicular direction X3 is restricted. Accordingly, the amount of displacement of the main body portion 30 inside the insertion hole 29 relative to the fixed housing 11 in the perpendicular direction X3 is restricted. In other words, in the state where the main body portion 30 has been inserted into the insertion hole 29, the amount of displacement of the movable housing 12 relative to the fixed housing 11 in the perpendicular direction X3 is restricted.

Also, as shown in FIGS. 1 to 8 and 10, the main body portion 30 is provided with a flange portion 30*e* that projects as a flange from an end portion in the direction opposite to the insertion direction X1. The flange portion 30*e* projects as a flange from the end portion of the main body portion 30 toward both sides in the width direction X2 and toward the rear wall 22 in the perpendicular direction X3. As shown in FIGS. 5A, 5B, 6A, 6B, and 7, the main body portion 30 is inserted into the insertion hole 29 of the fixed housing 11 and connected to the fixed housing 11 via the terminals 13, and in the state where the main body portion 30 is supported by the fixed housing 11 via the terminals 13, the flange portion 30*e* of the main body portion 30 is separated by gaps from the side wall 23, the side wall 24, and the rear wall 22. Specifically, a gap is formed between the flange portion 30*e* and the end portion of the side wall 23 in the direction opposite to the insertion direction X1, a gap is formed between the flange portion 30*e* and the end portion of the side wall 24 in the direction opposite to the insertion direction X1, and a gap is formed between the flange portion 30*e* and the end portion of the rear wall 22 in the direction opposite to the insertion direction X1. If the main body portion 30 becomes displaced in the insertion direction X1, the flange portion 30*e* of the main body portion 30 abuts against the end portions of the side wall 23, the side wall 24, and the rear wall 22 in the direction opposite to the insertion direction X1, and the amount of displacement of the main body portion 30 in the insertion direction X1 is restricted. Accordingly, the amount of displacement of the main body portion 30 inside the insertion hole 29 relative to the fixed housing 11 in the insertion direction X1 is restricted. In other words, in the state where the main body portion 30 has been inserted into the insertion hole 29, the amount of displacement of the movable housing 12 relative to the fixed housing 11 in the insertion direction X1 is restricted.

Also, as shown in FIGS. 5A, 5B, 6A, 6B, and 7, the main body portion 30 includes a plurality of holding chambers 30*f* that respectively accommodate and hold later-described partner connection portions 34 of the terminals 13. The holding chambers 30*f* are provided as spatial regions inside the main body portion 30, and are arranged side by side in the width direction X2 inside the main body portion 30. Also, each of the holding chambers 30*f* is provided as a substantially rectangular parallelepiped spatial region inside the main body portion 30, and is open in the insertion direction X1. The partner connection portions 34 of the terminals 13 are inserted into the holding chambers 30*f* through the openings of the holding chambers 30*f* in the direction opposite to the insertion direction X1. The partner connection portions 34 of the terminals 13 are inserted into the holding chambers 30*f* so as to be press-fitted and held in the holding chambers 30*f*.

Also, as shown in FIGS. 1 to 4, 6A, 6B, 7, 8, and 10, the main body portion 30 is provided with a plurality of connection holes 30*g* into which the partner terminals 101*a* of the partner connectors 101 are respectively inserted, in the end portion in the direction opposite to the insertion direction X1. The connection holes 30*g* are arranged side by side in the width direction X2 in the end portion of the main body portion 30 in the direction opposite to the insertion direction X1. Also, each of the connection holes 30*g* is provided as a through hole that passes through the end portion of the main body portion 30 in the insertion direction X1 while extending from the outside of the main body portion 30 toward the holding chamber 30*f* inside the main body portion 30. When connecting the connector 1 and the partner connector 101, the partner terminals 101*a* of the partner connector 101 are respectively inserted into the connection holes 30*g* of the movable housing 12 of the connector 1. The partner terminals 101*a* inserted into the connection holes 30*g* come into contact with the partner connection portions 34 of the terminals 13 held in the holding chambers 30*f*, and are electrically connected thereto.

As shown in FIGS. 1 to 4, 6A, 6B, 7, 8, and 10, the protrusion portion 31 of the movable housing 12 is provided as a portion that projects from the main body portion and has as a substantially rectangular parallelepiped shape elongated along the width direction X2. The protrusion portion 31 is provided such that, in the state where the main body portion 30 has been inserted into the insertion hole 29, the protrusion portion 31 projects from the main body portion 30 along the perpendicular direction X3, which is perpendicular to both the insertion direction X1 in which the main body portion 30 is inserted into the insertion hole 29 and the width direction X2 in which the terminals 13 are arranged side by side in the fixed housing 11.

Also, the protrusion portion 31 is provided such that in the state where the main body portion 30 has been inserted into the insertion hole 29, the protrusion portion 31 projects from the main body portion 30 toward the terminal holding wall 21, to which the terminals 13 are fixed, of the fixed housing 11 in the perpendicular direction X3. Note that the terminals 13 are each provided with the fixing portion 33 that is fixed to the terminal holding wall 21 of the fixed housing 11. Therefore, in the state where the main body portion 30 has been inserted into the insertion hole 29, the protrusion portion 31 projects from the main body portion 30 toward the side of the fixed housing 11 on which the fixing portions 33 of the terminals 13 are fixed, with respect to the perpendicular direction X3. Note that the first wall portions 27*a* of the partition walls 27 are arranged in the region on the terminal holding wall 21 side inside the fixed housing 11. A space is formed inside the fixed housing 11, in a region on the side of the first wall portions 27*a* opposite to the insertion direction X1 side. The protrusion portion 31 projecting from the main body portion 30 projects toward the terminal holding wall 21 in the perpendicular direction X3, in the space in the region on the side of the first wall portions 27*a* opposite to the insertion direction X1 side, inside the fixed housing 11. Also, in the state where the main body portion 30 has been inserted into the insertion hole 29, the protrusion portion 31 projects from the main body portion 30 along the perpendicular direction X3 and also extends along the width direction X2.

Terminals

Figure 11:
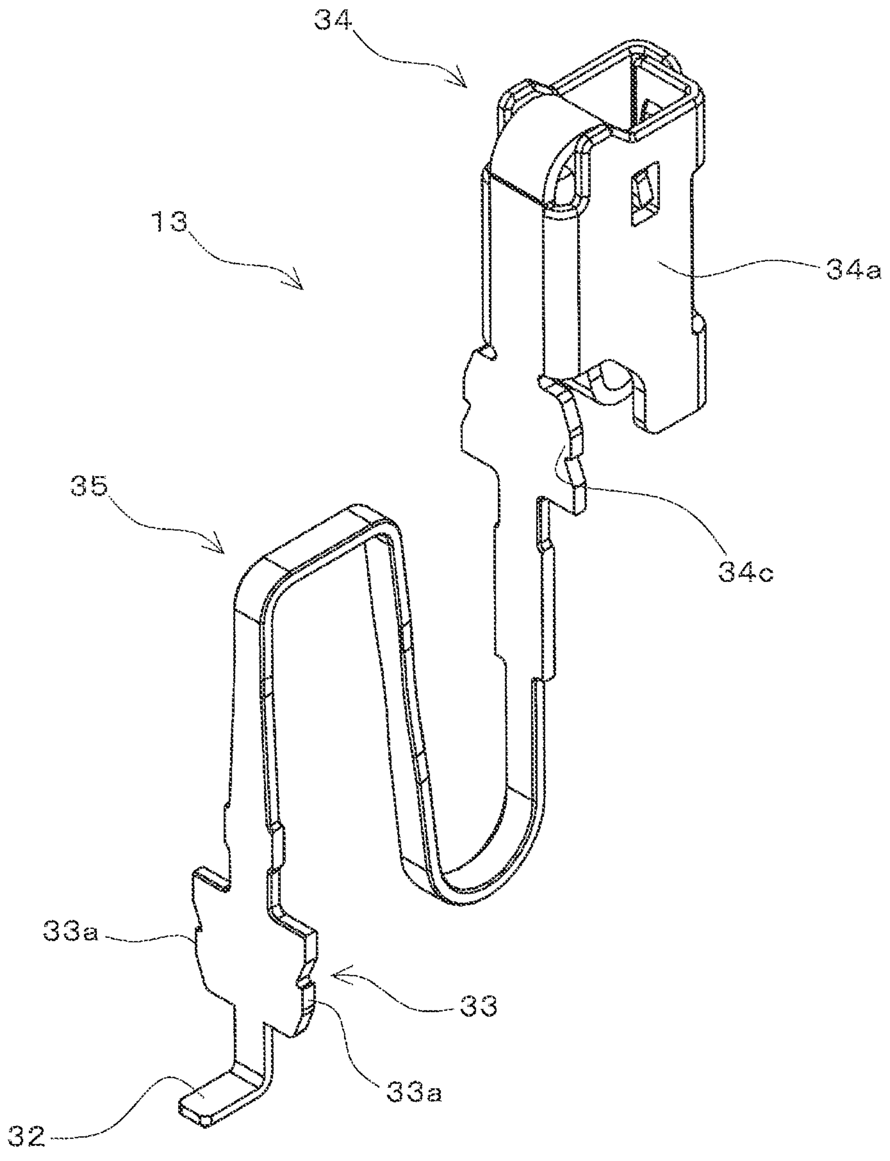
FIG. 11 is a perspective view showing a terminal of the connector.

FIG. 11 is a perspective view showing a terminal 13, and more specifically is an enlarged perspective view showing one of the terminals 13 in the connector 1. As shown in FIGS. 1 to 8 and 11, the connector 1 includes the terminals 13, and the terminals 13 are arranged side by side in the width direction X2 in the connector 1. Each of the terminals 13 has one end portion side fixed to the fixed housing 11 and another end portion side held by the movable housing 12, and the portion between the two end portions is elastically deformable. Accordingly, the terminals 13 are configured to support the movable housing 12 so as to be displaceable relative to the fixed housing 11. Also, each of the terminals 13 is mounted and fixed to the substrate 100 by soldering on the one end portion side, and is in contact with and electrically connected to a partner terminal 101*a* of the partner connector 101 on the other end portion side.

Also, each of the terminals 13 specifically includes a substrate connection portion 32, a fixing portion 33, a partner connection portion 34, and a movable spring portion 35. In the terminal 13, the substrate connection portion 32, the fixing portion 33, the movable spring portion 35, and the partner connection portion 34 are arranged side by side in this order and integrated with each other. The substrate connection portion 32 and the fixing portion 33 are provided on the one end portion side of the terminal 13, and the partner connection portion 34 is provided on the other end portion side of the terminal 13.

As shown in FIGS. 1 to 4, 6A, 6B, 7, 8, and 9, the substrate connection portion 32 is provided as the one end portion of terminal 13 and is connected to substrate 100. The substrate connection portion 32 is electrically and mechanically connected to the substrate 100 by being fixed to the upper surface of the substrate 100 by soldering.

As shown in FIGS. 2 to 4, 6A, 6B, 7, 8, and 11, the fixing portion 33 is provided as a portion that is attached and fixed to the fixed housing 11, and is arranged adjacent to the substrate connection portion 32 in the one end portion of terminal 13. The fixing portion 33 is fixed to the terminal holding wall 21 by being press-fitted into the terminal fixing portion 25 of the terminal holding wall 21 of the fixed housing 11. Note that the fixing portion 33 includes a pair of press-fit claw portions 33*a* that project toward two sides in the width direction. When press-fitting the fixing portion 33 into the terminal fixing portion 25, the pair of press-fit claw portions 33*a* of the fixing portion 33 are inserted and press-fitted into the pair of press-fit grooves 25*a* of the terminal fixing portion 25. By press-fitting the pair of press-fit claw portions 33*a* of the fixing portion 33 into the pair of press-fit grooves 25*a* of the terminal fixing portion 25, the fixing portion 33 is fixed to the terminal fixing portion 25, and the terminal 13 is held by the terminal holding wall 21 of the fixed housing 11.

As shown in FIGS. 4 to 7 and 11, the partner connection portion 34 is provided as a portion on the other end portion side of the terminal 13, and is held by the movable housing 12 and connected to a corresponding partner terminal 101*a* among the partner terminals 101*a* of the partner connector 101. The partner connection portion 34 is provided as a female terminal type of connection portion, and includes a tubular portion 34*a*, a spring contact portion 34*b*, and a press-fit portion 34*c*.

The tubular portion 34*a* of the partner connection portion 34 is provided as a portion formed by being bent into a square tubular shape. When the partner connection portion 34 is to be held by the movable housing 12, the tubular portion 34*a* is inserted into the holding chamber 30*f* of the main body portion 30 of the movable housing 12 and held therein. The tubular portion 34*a* is open in a direction opposite to the insertion direction X1, and when the tubular portion 34*a* is inserted into the holding chamber 30*f*, the opening of the tubular portion 34*a* faces the connection hole 30*g* of the main body portion 30. When connecting the terminal 13 to the partner terminal 101*a*, the partner terminal 101*a* inserted through the connection hole 30*g* is inserted into the tubular portion 34*a* inside the holding chamber 30*f*.

The spring contact portion 34*b* of the partner connection portion 34 is provided in the shape of a plate spring that is bent inside the tubular portion 34*a*, and includes a contact portion that comes into contact with and is electrically connected to the partner terminal 101*a*. When the terminal 13 is connected to the partner terminal 101*a*, the spring contact portion 34*b* comes into contact with and is electrically connected to the partner terminal 101*a* that was inserted through the connection hole 30*g* of the movable housing 12 and extends into the tubular portion 34*a*.

The press-fit portion 34*c* of the partner connection portion 34 is provided adjacent to the tubular portion 34*a*, and is a portion that is press-fitted into the main body portion 30 of the movable housing 12. When the tubular portion 34*a* is inserted into the holding chamber 30*f* of the main body portion 30 of the movable housing 12, the press-fit portion 34*c* is press-fitted to the inner wall of the holding chamber 30*f*. By press-fitting the press-fit portion 34*c* into the main body portion 30, the partner connection portion 34 is firmly held to the main body portion 30 of the movable housing 12.

As shown in FIGS. 3A, 3B, 4 to 8, and 11, the movable spring portion 35 is provided as a spring portion that integrally couples the fixing portion 33 and the partner connection portion 34 of the terminal 13 and supports the partner connection portion 34 so as to be displaceable relative to the fixing portion 33. The movable spring portion 35 is provided as an elongated leaf spring portion that extends while bending a plurality of times. Note that in the present embodiment, the movable spring portion 35 extends from the fixing portion 33 in a direction opposite to the insertion direction X1, then bends at a substantially right angle toward the rear wall 22 side in the perpendicular direction X3, then bends and extends at a substantially right angle in the insertion direction X1, further bends and extends in a semi-arc shape over approximately 180 degrees from the insertion direction X1 to a direction opposite to the insertion direction X1, and is then connected to the partner connection portion 34.

Also, the movable spring portion 35 of each terminal 13 arranged at a position other than the two end portions of the connector 1 in the width direction X2 is arranged in the fixed housing 11 so as to extend while bending a plurality of times between a pair of partition walls 27 that are adjacent in the width direction X2. Also, the movable spring portions 35 of the terminals 13 arranged at the positions on two end sides of the connector 1 in the width direction X2 are arranged in the fixed housing 11 so as to extend while bending a plurality of times between the side wall 23 and a partition wall 27 or between the side wall 24 and a partition wall 27.

Movement Restricting Member

Figure 12:
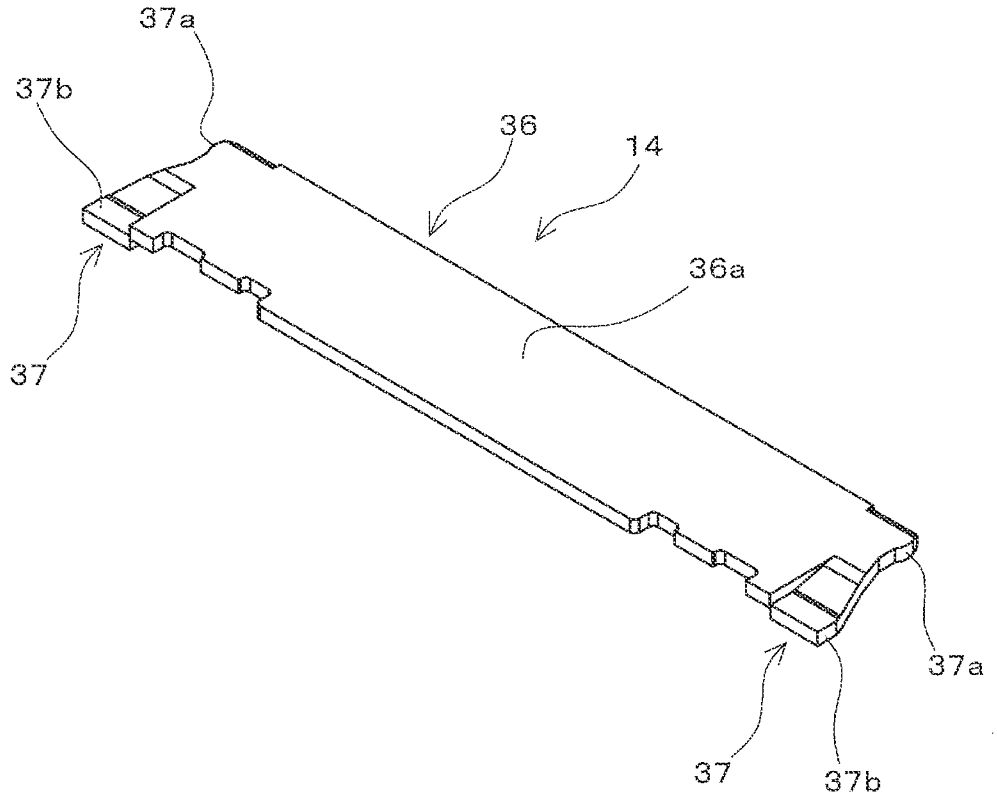
FIG. 12 is a perspective view showing a movement restricting member of the connector.

FIG. 12 is a perspective view showing the movement restricting member 14 of the connector 1. As shown in FIGS. 1 to 4, 6A, 6B, 7, 8, and 12, the movement restricting member 14 is provided as a metal member attached to the fixed housing 11 in the state where the main body portion 30 of the movable housing 12 has been inserted into the insertion hole 29 of the fixed housing 11.

The movement restricting member 14 is attached in a state of being arranged at the end portion of the fixed housing 11 in the direction opposite to the insertion direction X1, on the terminal holding wall 21 side in the perpendicular direction X3. Also, the movement restricting member 14 is attached to the fixed housing 11 in a state of being arranged on the side of the protrusion portion 31 of the movable housing 12 opposite to the side in the insertion direction X1, on the terminal holding wall 21 side in the perpendicular direction X3. When the main body portion 30 of the movable housing 12 has been inserted into the insertion hole 29 of the fixed housing 11 and becomes displaced relative to the fixed housing 11 in the direction opposite to the insertion direction X1, the movement restricting member 14 abuts against the protrusion portion 31 of the movable housing 12. In other words, when the main body portion 30 inserted into the insertion hole 29 becomes displaced in the direction of being removed from the insertion hole 29 of the fixed housing 11, the movement restricting member 14 abuts against the protrusion portion 31 of the movable housing 12. In this way, the movement restricting member 14 is configured to restrict the amount of displacement of the movable housing 12 relative to the fixed housing 11 by abutting against the protrusion portion 31 of the movable housing 12 when the movable housing 12 becomes displaced in the direction opposite to the insertion direction X1 (i.e., when the movable housing 12 becomes displaced in the direction of being removed from the fixed housing 11).

Also, the movement restricting member 14 specifically includes a plate-shaped portion 36 and a pair of attachment portions 37. The plate-shaped portion 36 is provided as a portion shaped as an elongated plate in the movement restricting member 14. Also, the plate-shaped portion 36 is provided as a portion that is arranged in a state of extending in a flat plate shape along the width direction X2 relative to the fixed housing 11, in the state where the movement restricting member 14 is attached to the fixed housing 11. The plate-shaped portion 36 is arranged so as to spread in a flat manner along a plane perpendicular to the insertion direction X1, on the side of the protrusion portion 31 of the movable housing 12 opposite to the side in the insertion direction X1, on the terminal holding wall 21 side in the perpendicular direction X3 in the fixed housing 11.

Also, the upper surface of the plate-shaped portion 36 constitutes a suction surface 36*a* provided as a flat surface. The flat suction surface 36*a* at the upper surface of the plate-shaped portion 36 is provided as a surface that is suctioned when the connector 1 is suctioned and transported. The suction surface 36*a* is arranged so as to spread in a flat manner along a plane perpendicular to the insertion direction X1, on the side of the protrusion portion 31 of the movable housing 12 opposite to the side in the insertion direction X1, on the terminal holding wall 21 side in the perpendicular direction X3 in the fixed housing 11. When the connector 1 is to be disposed and mounted on the substrate 100, the connector 1 is transported while being suctioned by a transport device (not shown), and is then disposed on the substrate 100. At this time, the connector 1 is transported in a state where the transport device suctions the suction surface 36*a* of the plate-shaped portion 36 of the movement restricting member 14 attached to the fixed housing 11.

The pair of attachment portions 37 of the movement restricting member 14 are integrated with the plate-shaped portion 36 at the two end portions of the plate-shaped portion 36 in the width direction X2, and are the portions of the movement restricting member 14 that are attached to the fixed housing 11. The pair of attachment portions 37 are attached by being respectively press-fitted into the pair of attachment grooves 28 provided at the two end portions of the fixed housing 11 in the width direction X2. For this reason, the pair of attachment portions 37 are attached by being press-fitted to inward sides of the fixed housing 11 in the width direction X2. The pair of attachment portions 37 are respectively press-fitted into the pair of attachment grooves 28, and thus the movement restricting member 14 is attached in a state of being fixed to the fixed housing 11.

As shown in FIGS. 8 and 12, the two attachment portions 37 each include a press-fit projection 37*a* and an engagement spring 37*b*. The press-fit projection 37*a* is provided in the attachment portion 37 as a projection that projects outward in the width direction X2. When the pair of attachment portions 37 are press-fitted into the pair of attachment grooves 28, the press-fit projections 37*a* engage with the inward surfaces of the attachment grooves 28, and the pair of attachment portions 37 are fixed and attached in the pair of attachment grooves 28.

The engagement spring 37*b* is provided in the attachment portion 37 as a plate spring portion that extends in a cantilevered manner and has a portion that is bent at an intermediate position. When the pair of attachment portions 37 are respectively press-fitted into the pair of attachment grooves 28, the engagement springs 37*b* temporarily bend inside the attachment grooves 28. When the attachment portions 37 have been completely press-fitted into the attachment grooves 28, the temporarily bent engagement springs 37*b* undergo elastic recovery, and the leading end portions of the engagement springs 37*b* engage with protrusion portions provided at the edge portions of the entrances of the attachment grooves 28. Due to the leading end portions of the engagement springs 37*b* engaging with the edge portions of the attachment grooves 28, the attachment portions 37 are press-fitted into the attachment grooves 28 and prevented from coming out.

As shown in FIGS. 3A, 3B, 6A, 6B, and 7, in the state where the attachment portions 37 have been press-fitted into the attachment grooves 28 and the movement restricting member 14 has been attached to the fixed housing 11, a gap is formed in the direction opposite to the insertion direction X1 between the protrusion portion 31 of the movable housing 12 and the plate-shaped portion 36 of the movement restricting member 14. If the movable housing 12 becomes displaced relative to the fixed housing 11 in the direction opposite to the insertion direction X1, the protrusion portion 31 of the movable housing 12 and the plate-shaped portion 36 of the movement restricting member 14 abut against each other, thus restricting the amount of displacement of the movable housing 12 in the direction opposite to the insertion direction X1.

Assembly of Connector

The connector 1 described above is obtained by attaching together the fixed housing 11, the pair of fixing fittings 15, the terminals 13, the movable housing 12, and the movement restricting member 14. When assembling the connector 1, first, the pair of fixing fittings 15 are attached to the fixed housing 11. The pair of fixing fittings 15 are attached to the fixed housing 11 by being respectively press-fitted into the press-fit grooves provided in the side wall 23 and the side wall 24 of the fixed housing 11.

The terminals 13 are attached to the movable housing 12, and thus the terminals 13 are held by the movable housing 12. The terminals 13 are attached to the movable housing 12 by inserting and press-fitting the partner connection portions 34 of the terminals 13 into the holding chambers 30*f* of the movable housing 12. More specifically, the tubular portions 34*a* of the partner connection portions 34 of the terminals 13 are respectively inserted into the holding chambers 30*f*, and the press-fit portions 34*c* of the partner connection portions 34 are press-fitted to the inner walls of the holding chambers 30*f*. Accordingly, the terminals 13 are fixed by inserting and press-fitting the partner connection portions 34 into the holding chambers 30*f*, and are attached to and held by the movable housing 12.

After attaching the fixing fittings 15 to the fixed housing 11 and attaching the terminals 13 to the movable housing 12, the terminals 13 are attached to the fixed housing 11, and the movable housing 12 is mounted to the fixed housing 11. The attachment of the terminals 13 to the fixed housing 11 and the mounting of the movable housing 12 to the fixed housing 11 are performed at approximately the same timing. Specifically, the terminals 13 held by the movable housing 12 are attached to the fixed housing 11, and at this time, the movable housing 12 holding the terminals 13 is mounted to the fixed housing 11.

When the terminals 13 attached to the movable housing 12 are to be attached to the fixed housing 11, the movable spring portions 35 of the terminals 13 are inserted into the fixed housing 11, and the fixing portions 33 of the terminals 13 are respectively press-fitted into the terminal fixing portions 25 of the terminal holding wall 21 of the fixed housing 11. The terminals 13 are fixed and attached to the fixed housing 11 by press-fitting the fixing portions 33 of the terminals 13 respectively into the terminal fixing portions 25 of the terminal holding wall 21.

Also, when attaching the terminals 13 to the fixed housing 11, the main body portion 30 of the movable housing 12 holding the terminals 13 is inserted into the insertion hole 29 of the fixed housing 11. When the main body portion 30 is inserted into the insertion hole 29 and the fixing portions 33 of the terminals 13 held by the movable housing 12 are fixed to the fixed housing 11, the movable housing 12 is supported via the terminals 13 so as to be displaceable relative to the fixed housing 11. Accordingly, the mounting of the movable housing 12 to the fixed housing 11 is complete. Note that in the state where the main body portion 30 has been inserted into the insertion hole 29 and the movable housing 12 is mounted to the fixed housing 11, the protrusion portion 31 is arranged so as to project toward the terminal holding wall 21 in the perpendicular direction X3 at a position inside the fixed housing 11 in the width direction X2.

After the attachment of the terminals 13 to the fixed housing 11 and the mounting of the movable housing 12 to the fixed housing 11 have ended, next, the movement restricting member 14 is attached to the fixed housing 11. The movement restricting member 14 is attached by press-fitting the pair of attachment portions 37, which are provided at the two end portions of the movement restricting member 14 in the width direction X2, into the pair of attachment grooves 28 provided on the two end sides of the fixed housing 11 in the width direction X2. When the attachment portions 37 are press-fitted into the attachment grooves 28 and the movement restricting member 14 is attached to the fixed housing 11, the plate-shaped portion 36 of the movement restricting member 14 is on the side of the protrusion portion 31 of the movable housing 12 opposite to the side in the insertion direction X1. For this reason, when the movable housing 12 becomes displaced relative to the fixed housing 11 in the direction opposite to the insertion direction X1 (when the movable housing 12 becomes displaced in the direction in which the movable housing 12 is removed from the fixed housing 11), the protrusion portion 31 of the movable housing 12 abuts against the plate-shaped portion 36 of the movement restricting member 14, thus restricting the amount of displacement of the movable housing 12 in the direction opposite to the insertion direction X1.

Connection of Substrate to Partner Connector by Connector

The following describes the connection of the substrate 100 to the partner connector 101 by the connector 1 assembled as described above. The substrate 100 is provided with an electrically conductive circuit pattern (not shown) on the upper surface, for example, and the connector 1 is mounted and connected to the substrate 100.

When connecting the connector 1 to the substrate 100, the connector 1 is transported in a state of being suctioned by a transport device (not shown), and then disposed on the substrate 100. At this time, the suction surface 36*a* of the plate-shaped portion 36 of the movement restricting member 14 is suctioned by the transport device while transporting the connector 1. When the connector 1 is disposed on the substrate 100, the substrate connection portions 32 of the terminals 13 of the connector 1 are then soldered to the substrate 100, and the pair of fixing fittings of the connector 1 are also soldered to the substrate 100. Accordingly, the connection of the connector 1 and the substrate 100 is complete.

After the connector 1 has been connected to the substrate 100, the partner connector 101 is then connected to the connector 1. Accordingly, the substrate 100 and the partner connector 101 are electrically connected via the connector 1. When connecting the partner connector 101 to the connector 1, the partner terminals 101*a* of the partner connector 101 are inserted into the movable housing 12. At this time, the partner terminals 101*a* are inserted into the connection holes 30*g* provided in the main body portion 30 of the movable housing 12. The partner terminals 101*a* that have been inserted into the connection holes 30*g* come into contact with the spring contact portions 34*b* of the partner connection portions 34 of the terminals 13 held inside the movable housing 12, and are electrically connected to the terminals 13. Accordingly, the connector 1 and the partner connector 101 are connected, and the substrate 100 and the partner connector 101 are electrically connected via the connector 1.

In the connector 1, the movable housing 12, to which the partner terminals 101*a* of the partner connector 101 are connected, is supported via the terminals 13 so as to be displaceable relative to the fixed housing 11 connected to the substrate 100. For this reason, even if positional deviation occurs between the substrate 100 and the partner connector 101, the positional deviation is absorbed by relative displacement between the movable housing 12 and the fixed housing 11. For example, even if vibration occurs on the substrate 100 side, the vibration generated on the substrate 100 side is absorbed by elastic deformation of the movable spring portions 35 of the terminals 13 between the substrate 100 and the partner connector 101, thus suppressing the transmission of vibration to the partner connector 101.

When disconnecting the connector 1 from the partner connector 101, the partner connector 101 is operated so as to move relative to the connector 1 in the direction opposite to the insertion direction X1. In other words, when disconnecting the connector 1 from the partner connector 101, the partner connector 101 is operated so as to move in a direction of being pulled out from the connector 1. Accordingly, the partner terminals 101*a* of the partner connector 101 move so as to be pulled out of the movable housing 12. By pulling out the partner terminals 101*a* from the movable housing 12, the connector 1 and the partner connector 101 are disconnected from each other.

Note that when the connector 1 and the partner connector 101 are connected, the partner connection portions 34 of the terminals 13 of the connector 1 and the partner terminals 101*a* of the partner connector 101 are in contact with each other in a state of being pressed against each other. For this reason, when disconnecting the connector 1 from the partner connector 101, due to frictional force applied due to the partner terminals 101*a* moving relative to the partner connection portions 34 of the terminals 13, the partner terminals 101*a* generate force that pulls the partner connection portions 34 in the direction opposite to the insertion direction X1. For this reason, there is a possibility that the terminal 13 undergo a large amount of deformation.

However, when the partner connection portions 34 attempt to become displaced more than a predetermined amount of displacement in the direction opposite to the insertion direction X1, the protrusion portion 31 of the movable housing 12, to which the partner connection portion 34 is fixed, abuts against the movement restricting member 14 fixed to the fixed housing 11. Accordingly, movement of the movable housing 12 in the direction opposite to the insertion direction X1 is restricted, and excessive displacement of the partner connection portion 34 in the direction opposite to the insertion direction X1 is prevented. For this reason, the partner terminals 101*a* become displaced and separated from the partner connection portions 34 in resistance to the frictional force generated between the partner terminals 101*a* and the partner connection portions 34, and the partner terminals 101*a* are pulled out from the movable housing 12. Accordingly, excessive deformation of the terminals 13 and damage to the terminals 13 are prevented when disconnecting the connector 1 from the partner connector 101.

Actions and Effects of Present Embodiment

According to the present embodiment, the connector 1 is configured such that the movable housing 12 can be displaced relative to the fixed housing 11 due to the movable housing 12 being supported by the fixed housing 11 via the terminals 13. Also, according to the present embodiment, in the state where the main body portion of the movable housing 12 has been inserted in a loose-fit state into the insertion hole 29 of the fixed housing 11, the protrusion portion 31 projecting from the main body portion 30 is able to abut against the movement restricting member 14, which is made of metal and attached to the fixed housing 11. If the main body portion 30 becomes displaced in the direction opposite to the insertion direction X1, which is the direction of being removed from the fixed housing 11, the protrusion portion 31 of the movable housing 12 and the movement restricting member 14 abut against each other, thus restricting the amount of displacement of the movable housing 12 relative to the fixed housing 11. For this reason, according to the present embodiment, the amount of displacement of the movable housing 12 relative to the fixed housing 11 can be restricted, and it is possible to prevent the terminals 13 from being excessively deformed and damaged. Also, according to the present embodiment, the protrusion portion 31 of the movable housing 12, which abuts against the movement restricting member 14 that restricts the amount of displacement of the movable housing 12, projects in the perpendicular direction X3, which is perpendicular to both the width direction, which is the pitch direction in which the terminals 13 are arranged side by side, and the insertion direction of the movable housing 12. For this reason, an increase in the size of the movable housing 12 in the width direction is suppressed. Furthermore, due to the movement restricting member 14, which abuts against the protrusion portion 31 of the movable housing 12 to restrict the amount of displacement of the movable housing 12, being provided as a member attached to the fixed housing 11, an increase in the size of the fixed housing 11 in the width direction is also suppressed. Accordingly, an increase in the size of the connector 1 is suppressed.

Therefore, according to the present embodiment, in the connector 1 configured such that the movable housing 12 can be displaced relative to the fixed housing 11, the amount of displacement of the movable housing 12 relative to the fixed housing 11 can be restricted, and it is possible to suppress an increase in the size of the connector 1 in the width direction X2, which is the pitch direction in which the terminals 13 are arranged side by side.

Also, according to the present embodiment, each of the terminals 13 includes the substrate connection portion 32 that is to be connected to the substrate 100, the fixing portion 33 that is to be fixed to the fixed housing 11, and the partner connection portion 34 that is on the side of the movable spring portion 35 opposite to the fixing portion 33 and is to be connected to a corresponding partner terminal 101*a* that is the partner connection member. For this reason, the terminals 13, which support the movable housing 12 so as to be displaceable relative to the fixed housing 11, each have a simple structure in which the substrate connection portion 32, the fixing portion 33, the movable spring portion 35, and the partner connection portion 34 are coupled to each other as an integrated body. Also, in the present embodiment, the partner connection portions 34 of the terminals 13 are held in the main body portion 30 of the movable housing 12. Moreover, in the present embodiment, the protrusion portion 31 projecting from the main body portion 30 of the movable housing 12 projects toward the side on which the fixing portions 33 of the terminals 13 are fixed, in the direction (perpendicular direction X3) perpendicular to the width direction X2 and the insertion direction X1 in the fixed housing 11. For this reason, the protrusion portion 31 is arranged in a state of projecting from the side corresponding to the insertion hole 29, which receives insertion of the main body portion 30 of the movable housing 12 that holds the partner connection portions 34 of the terminals 13, toward the side on which the fixing portions 33 of the terminals 13 are fixed, in the fixed housing 11. Accordingly, in the fixed housing 11, the space on the side where the fixing portions 33 of the terminals 13 are fixed can be efficiently used to dispose the protrusion portion 31. For this reason, it is possible to prevent an increase in the size of the connector 1 in which the protrusion portion 31 of the movable housing 12 projects in the fixed housing 11 toward the side opposite to the side on which the fixing portions 33 are fixed, and it is possible to further suppress an increase in the size of the connector 1 in the direction (perpendicular direction X3) perpendicular to the width direction X2 and the insertion direction X1.

Also, according to the present embodiment, displacement of the movable housing 12 relative to the fixed housing 11 is restricted by the plate-shaped portion 36 of the movement restricting member 14, which extends along the width direction X2 of the fixed housing 11, abutting against the protrusion portion 31 of the movable housing 12, which extends in the width direction X2 of the fixed housing 11 and projects in the direction (perpendicular direction X3) perpendicular to the width direction X2 and the insertion direction X1. For this reason, the movement restricting member 14 and the protrusion portion 31 of the movable housing 12 can abut against each other over a wide area in the width direction X2 of the fixed housing 11. Accordingly, a wide area of abutment between the plate-shaped portion 36 and the protrusion portion 31 can be ensured, and displacement of the movable housing 12 relative to the fixed housing 11 can be reliably and stably restricted.

Also, according to the present embodiment, the attachment portions 37 of the movement restricting member 14 are attached by being press-fitted into the fixed housing 11, and therefore the movement restricting member 14, which is made of metal, can be easily and firmly fixed and attached to the fixed housing 11. Also, since the attachment portions 37 of the movement restricting member 14 are press-fitted to inward sides of the fixed housing 11 in the width direction X2, the movement restricting member 14 can be prevented from being attached to the fixed housing 11 in a state of projecting from the fixed housing 11 in the width direction X2. Accordingly, it is possible to prevent an increase in the size of the connector 1 in the width direction caused if the movement restricting member 14 extends outward in the width direction X2.

Also, according to the present embodiment, when the main body portion 30 of the movable housing 12 is inserted into the insertion hole 29 of the fixed housing 11, the amount of displacement of the fixed housing 11 in the width direction X2 and the perpendicular direction X3 is restricted. For this reason, with a simple configuration in which the main body portion 30 of the movable housing 12 is inserted into the insertion hole 29 of the fixed housing 11, it is possible to restrict the amount of displacement of the movable housing 12 relative to the fixed housing 11 in the width direction X2 and the perpendicular direction X3.

Also, according to the present embodiment, the movement restricting member 14 includes the suction surface 36*a* that is suctioned during suctioning and transport of the connector 1 when the connector 1 is to be mounted on the substrate 100. For this reason, in the connector 1, the movement restricting member 14, which is made of metal and restricts the amount of displacement of the movable housing 12 relative to the fixed housing 11, can also be used as the suction surface 36*a* for the suctioning and transport of the connector 1. Also, according to the present embodiment, the suction surface 36*a* is provided in the movement restricting member 14 that is attached to the fixed housing 11, and therefore when the connector 1 is suctioned and transported, the connector 1 can be transported by suctioning the fixed housing 11, which is disposed on the substrate 100, rather than suctioning the movable housing 12 that can be displaced relative to the fixed housing 11. For this reason, the connector 1 can be mounted on the substrate 100 in a stable state in which the position of the fixed housing 11 does not shift relative to the substrate 100. Also, according to the present embodiment, the suction surface 36*a* is provided in the movement restricting member 14, thus eliminating the need to provide space for forming a separate suction surface in the fixed housing 11, and making it possible to further suppress an increase in the size of the fixed housing 11.

Variations

Although an embodiment of the present invention has been described above, the present invention is not limited to the above-described embodiment, and various modifications can be made within the scope of the claims. In other words, the present invention is not limited to the embodiment described above, but rather the scope of the present invention is of course intended to include all variations, applications, and equivalents thereof encompassed in the scope of the appended claims as variations and applications that would become apparent by reading and understanding this specification. For example, modifications such as the following may be implemented.

(1) In the above-described embodiment, an example is described in which the partner terminals 101*a*, which are the partner connection members that are to be connected to the terminals 13 of the connector 1, are pin-shaped male terminals, but the present invention is not limited to this example. For example, the partner terminals 101*a* that are the partner connection members may be provided as plate-shaped terminals, or be provided as terminals provided with a plate spring portion by bending a plate-shaped metal plate. Also, in the case where the terminals 13 of the connector 1 are configured as male terminals, the partner terminals 101*a* that are the partner connection members may be configured as female terminals.

(2) In the above-described embodiment, an example is described in which the substrate connection portions 32 of the terminals 13 of the connector 1 are connected to the substrate 100 by being mounted on the upper surface of the substrate 100 and soldered thereto, but the present invention is not limited to this example. For example, a configuration is possible in which through-holes are provided in the substrate 100, and the substrate connection portions 32 of the terminals 13 of the connector 1 are connected to the substrate 100 by being inserted into the through-holes of the substrate 100 and soldered thereto.

(3) In the above-described embodiment, an example is described in which the terminals 13 of the connector 1 are arranged side by side in one row along the width direction X2, but the present invention is not limited to this example. The connector may include terminals 13 arranged side by side in two rows along the width direction X2, and a variation such as that shown in FIGS. 13, 14A, and 14B is also possible, for example.

Figure 13:
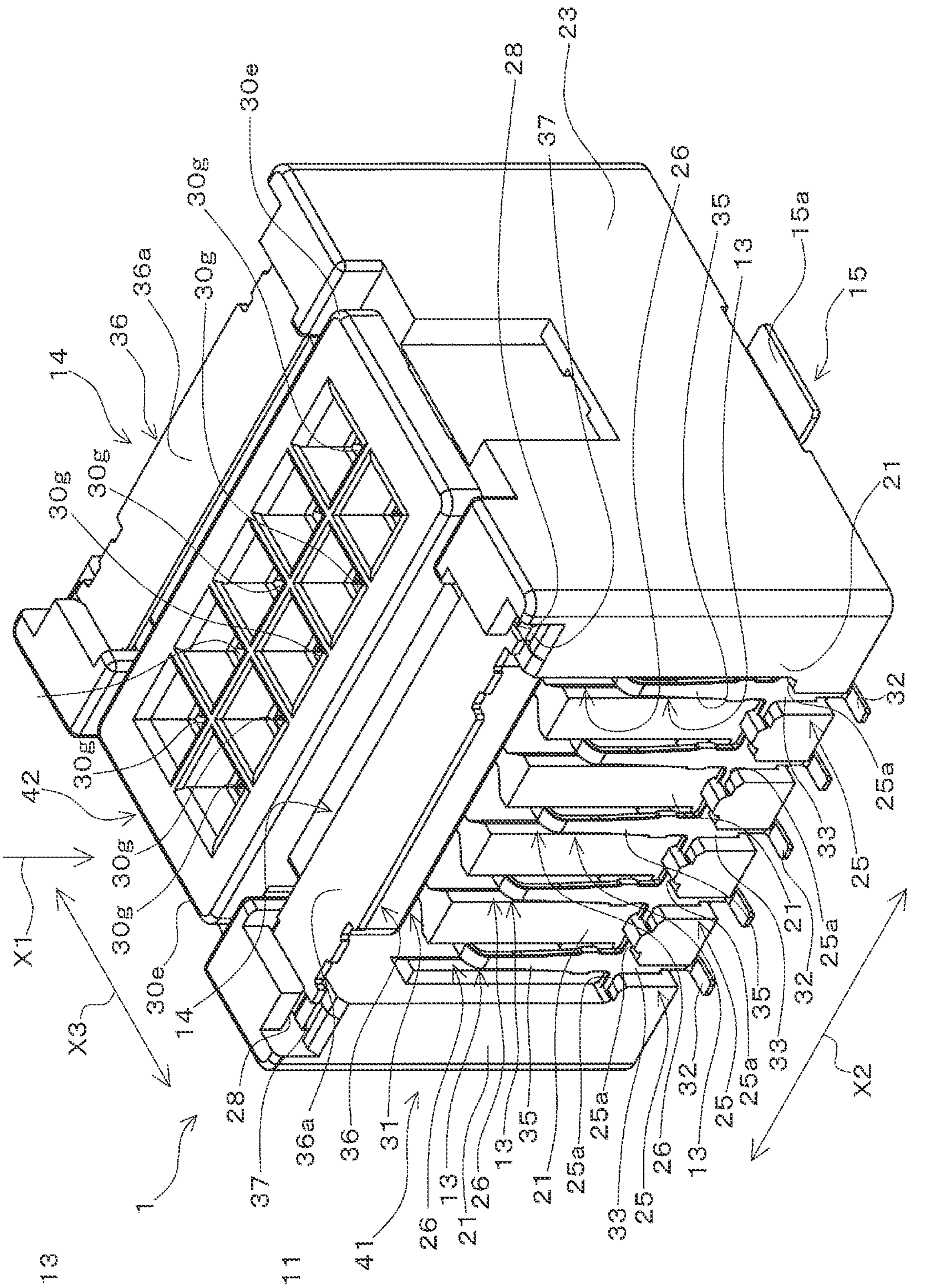
FIG. 13 is a perspective view showing a connector according to a first variation.

FIG. 13 is a perspective view showing a connector 2 according to a first variation. FIG. 14A is a front view of the connector 2 according to the first variation, and FIG. 14B is a cross-sectional view of the connector 2 according to the first variation, taken along line C-C in FIG. 14A. Note that in the following description of the first variation, elements having a configuration similar to the configuration in the above-described embodiment and elements having a configuration corresponding to the configuration in the above-described embodiment are denoted by the same reference numerals in the drawings and/or referenced by the same reference numerals in the description in order to omit redundant descriptions.

Figure 14B:
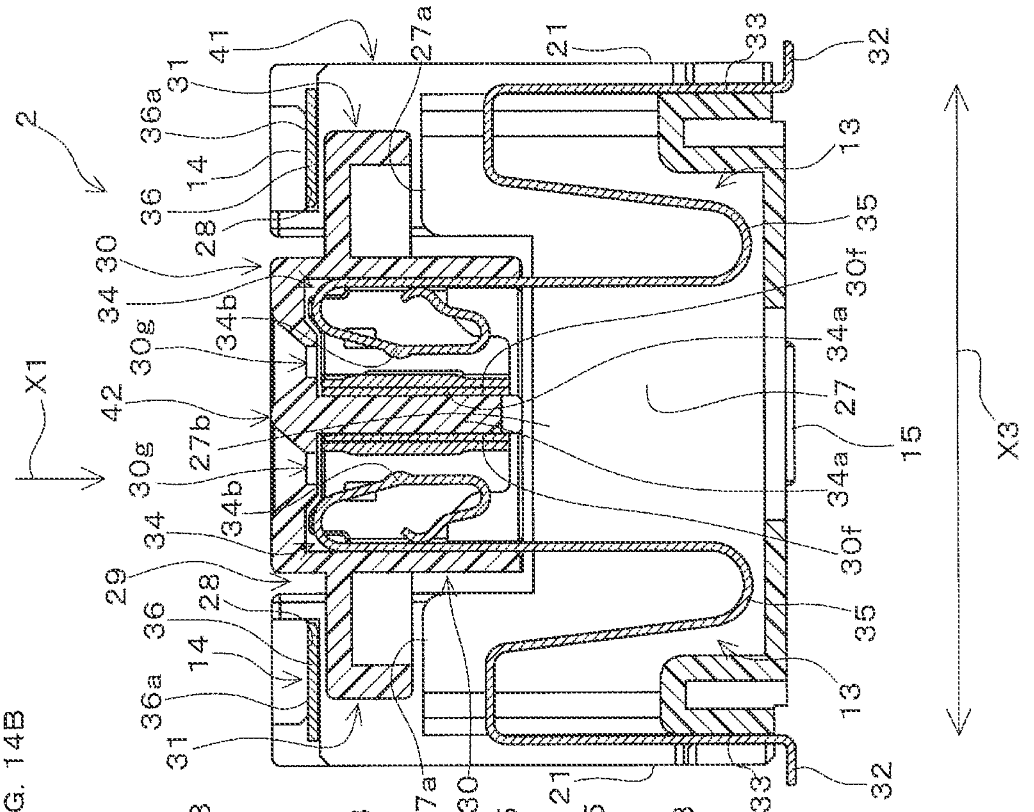
FIG. 14B is a cross-sectional view of the connector according to the first variation, taken along line C-C in FIG. 14A.
Figure 14A:
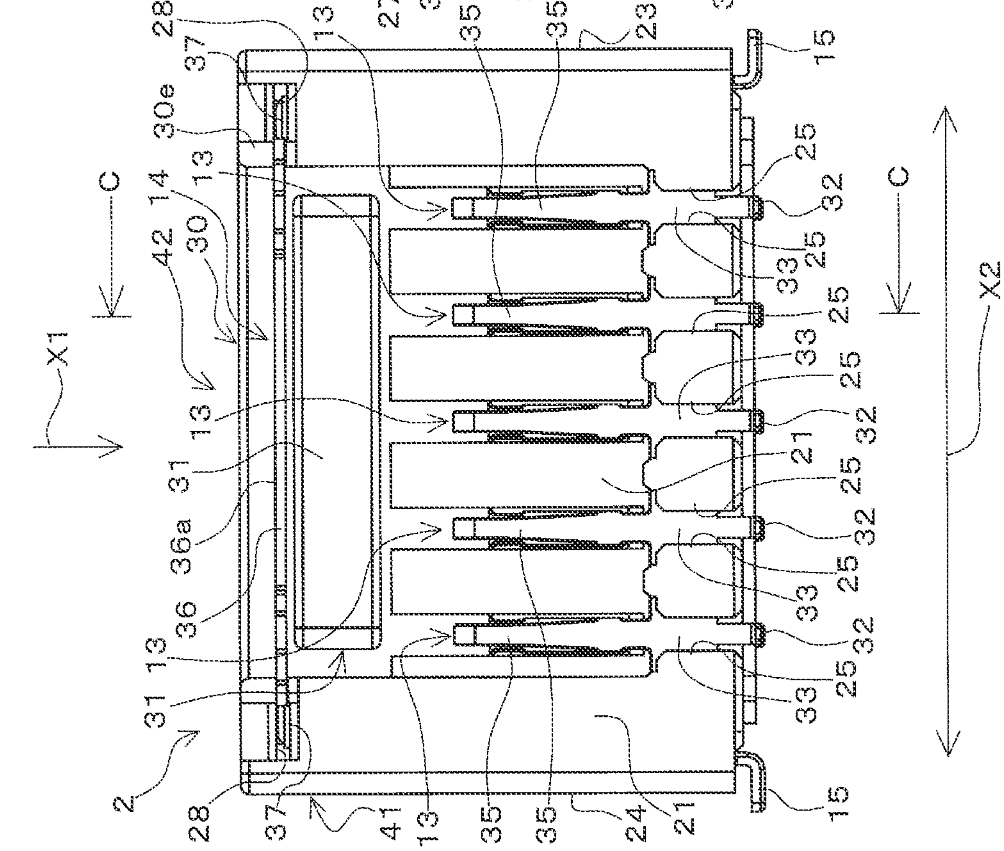
FIG. 14A is a front view of the connector according to the first variation.

The connector 2 according to the first variation shown in FIGS. 13, 14A, and 14B includes the terminals 13 arranged side by side in two rows along the width direction X2. Specifically, in the connector 2, the terminals 13 are arranged side by side in two rows along the width direction X2, which is the pitch direction in which the terminals 13 form rows. In the connector 2, the configurations of a fixed housing 41, a movable housing 42, and a movement restricting member 14 are partly different from those of the connector 1 of the above-described embodiment, in correspondence with the fact that the terminals 13 are arranged side by side in two rows.

The fixed housing 41 disposed on the substrate 100 has a configuration substantially similar to that of the fixed housing 11 of the connector 1, but unlike the fixed housing 11, the rear wall 22 is not provided, and two terminal holding walls 21 are provided. Specifically, the fixed housing 41 includes the pair of terminal holding walls 21 that are arranged opposite to each other and extend parallel with each other, and the pair of side walls 23 and 24 that extend perpendicularly to the pair of terminal holding walls 21. Out of the pair of terminal holding walls 21, one terminal holding wall 21 is provided as a wall portion that holds the terminals 13 in one row among the terminals 13 arranged side by side in two rows along the width direction X2. Out of the pair of terminal holding walls 21, the other terminal holding wall 21 is provided as a wall portion that holds the terminals 13 in the other row among the terminals 13 arranged side by side in two rows along the width direction X2.

The movable housing 42, which is mounted so as to be displaceable relative to the fixed housing 41, has a configuration substantially similar to that of the movable housing 12 of the connector 1, but unlike the movable housing 12, in the main body portion 30, a plurality of holding chambers 30*f* and a plurality of connection holes 30*g* are both arranged side by side in two rows along the width direction X2. Specifically, in the main body portion 30 of the movable housing 42, a plurality of holding chambers 30*f* are arranged side by side in two rows along the width direction X2, and a plurality of connection holes 30*g* are also arranged side by side in two rows along the width direction X2. In the main body portion 30 of the movable housing 42, the two rows of holding chambers 30*f* are provided in correspondence with the two rows of connection holes 30*g*. Also, the holding chambers 30*f* in one of the two rows of holding chambers 30*f* in the main body portion 30 of the movable housing 42 hold the partner connection portions 34 of the terminals 13 in one of the two rows of terminals 13 of the connector 2. The holding chambers 30*f* in the other one of the two rows of holding chambers 30*f* in the main body portion 30 of the movable housing 42 hold the partner connection portions 34 of the terminals 13 in the other one of the two rows of terminals 13 of the connector 2.

Also, unlike the movable housing 12 of the connector 1, the movable housing 42 is provided with two protrusion portions 31 that project from the main body portion 30. Both of the two protrusion portions 31 of the movable housing 42 are provided so as to project from the main body portion 30 along the perpendicular direction X3, which is perpendicular to both the insertion direction X1 and the width direction X2, in the state where the main body portion 30 is inserted into the insertion hole 29. One protrusion portion 31 out of the pair of protrusion portions 31 is provided so as to project from the main body portion 30 toward one terminal holding wall 21 out of the pair of terminal holding walls 21 of the fixed housing 41. The other protrusion portion 31 out of the pair of protrusion portions 31 is provided so as to project from the main body portion 30 toward the other terminal holding wall 21 out of the pair of terminal holding walls 21 of the fixed housing 41. For this reason, in the connector 2, the pair of protrusion portions 31 are provided so as to project from the main body portion 30 toward opposite sides in the perpendicular direction X3.

Also, unlike the connector 1, the connector 2 is provided with two (rather than one) metal movement restricting members 14 that are attached to the fixed housing 41 in the state where the movable housing 42 is inserted into the fixed housing 41. One movement restricting member 14 out of the pair of movement restricting members 14 is attached in a state of being arranged at the end portion of the fixed housing 41 in the direction opposite to the insertion direction X1, on the side corresponding to one terminal holding wall 21 in the perpendicular direction X3. The other movement restricting member 14 out of the pair of movement restricting members 14 is attached in a state of being arranged at the end portion of the fixed housing 41 in the direction opposite to the insertion direction X1, on the side corresponding to the other terminal holding wall 21 in the perpendicular direction X3.

Also, the pair of movement restricting members 14 are attached in a state of being arranged on the side of the pair of protrusion portions 31 of the movable housing 42 opposite to the side in the insertion direction X1, on the corresponding terminal holding wall 21 sides in the perpendicular direction X3 in the fixed housing 41. When the main body portion 30 of the movable housing 42 has been inserted into the insertion hole 29 of the fixed housing 41 and becomes displaced relative to the fixed housing 41 in the direction opposite to the insertion direction X1, the pair of movement restricting members 14 abut against the pair of protrusion portions 31 of the movable housing 42. In other words, when the main body portion 30 has been inserted into the insertion hole 29 of the fixed housing 41 and becomes displaced in the direction of being removed from the insertion hole 29, the pair of movement restricting members 14 abut against the pair of protrusion portions 31 of the movable housing 42. In this way, when the movable housing 42 becomes displaced in the direction opposite to the insertion direction X1 (i.e., when the movable housing 42 becomes displaced in the direction of being removed from the fixed housing 41), the pair of movement restricting members 14 abut against the pair of protrusion portions 31 of the movable housing 42, thus restricting the amount of displacement of the movable housing 42 relative to the fixed housing 41.

As in the first variation shown in FIGS. 13, 14A, and 14B, the connector 2 may include the terminals 13 that are arranged side by side in two rows along width direction X2. Note that in the connector 2 of the first variation, an example is described in which two protrusion portions 31 are provided in the movable housing 42, and two movement restricting members 14 are provided, but the present invention is not limited to this example. The connector 2 of the first variation may have a configuration in which only one protrusion portion is provided in the movable housing 42, and only one movement restricting member 14 is provided. Specifically, in the connector 2 in which the terminals 13 are arranged side by side in two rows along the width direction X2, a configuration is possible in which, on only one of the two terminal holding wall 21 sides, a single protrusion portion 31 of the movable housing 42 projects from the main body portion 30, and a single movement restricting member 14 is attached.

(4) In the above-described embodiment, an example is described in which the insertion direction X1 of the connector 1 is perpendicular to the upper surface of the substrate 100, which spreads in a flat manner, when the connector 1 is disposed on the substrate 100, but the present invention is not limited to this example. A configuration is possible in which the insertion direction X1 of the connector is parallel with the upper surface of the substrate 100, which spreads in a flat manner, when the connector is disposed on the substrate 100, and a variation such as that shown in FIGS. 15, 16A, and 16B is also possible, for example.

Figure 15:
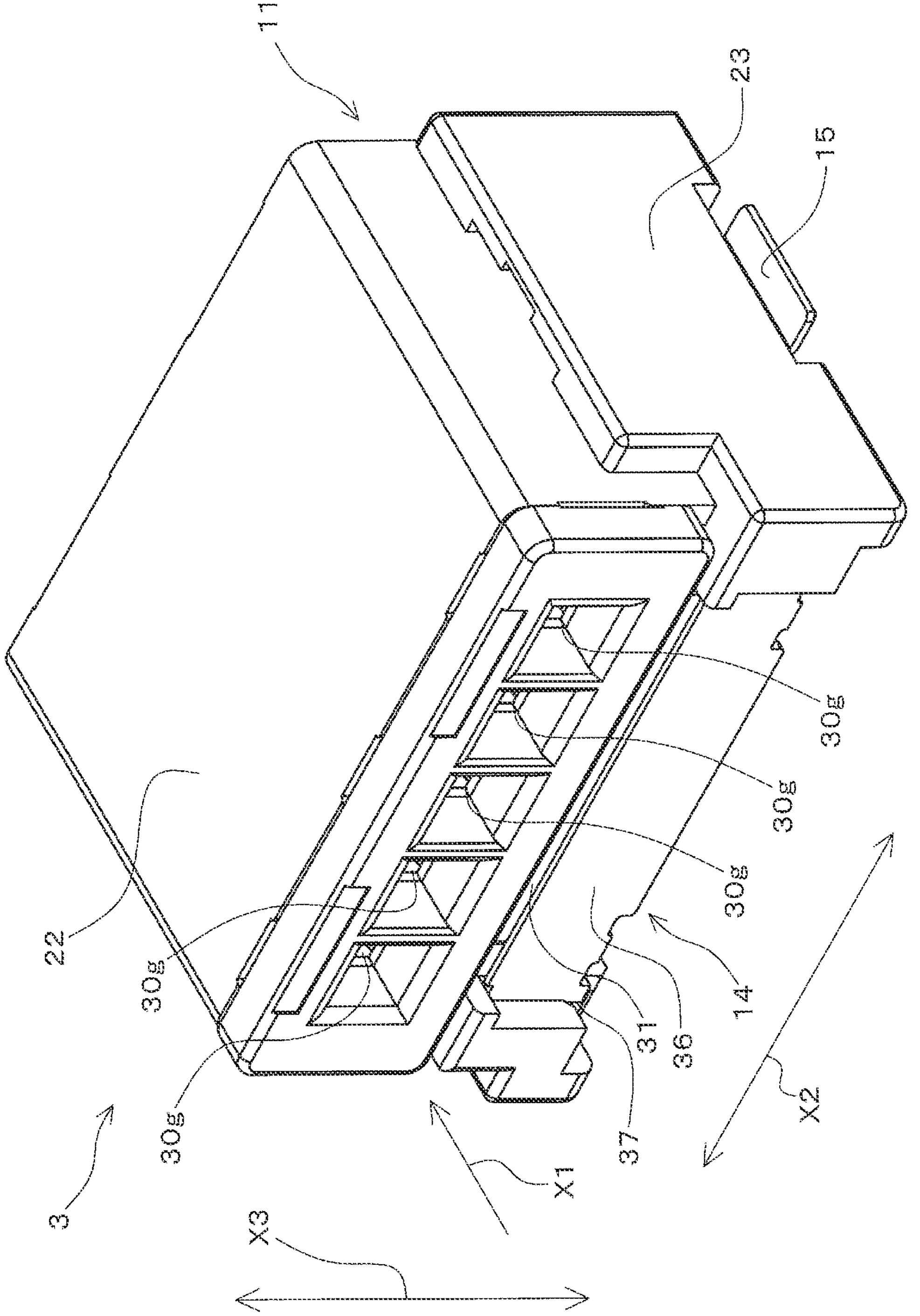
FIG. 15 is a perspective view showing a connector according to a second variation.

FIG. 15 is a perspective view showing a connector 3 according to a second variation. FIG. 16A is a front view of the connector 3 according to the second variation, and FIG. 16B is a cross-sectional view of the connector 3 according to the second variation, taken along line D-D in FIG. 16A. Note that in the following description of the second variation, elements having a configuration similar to the configuration in the above-described embodiment and elements having a configuration corresponding to the configuration in the above-described embodiment are denoted by the same reference numerals in the drawings and/or referenced by the same reference numerals in the description in order to omit redundant descriptions.

Figure 16B:
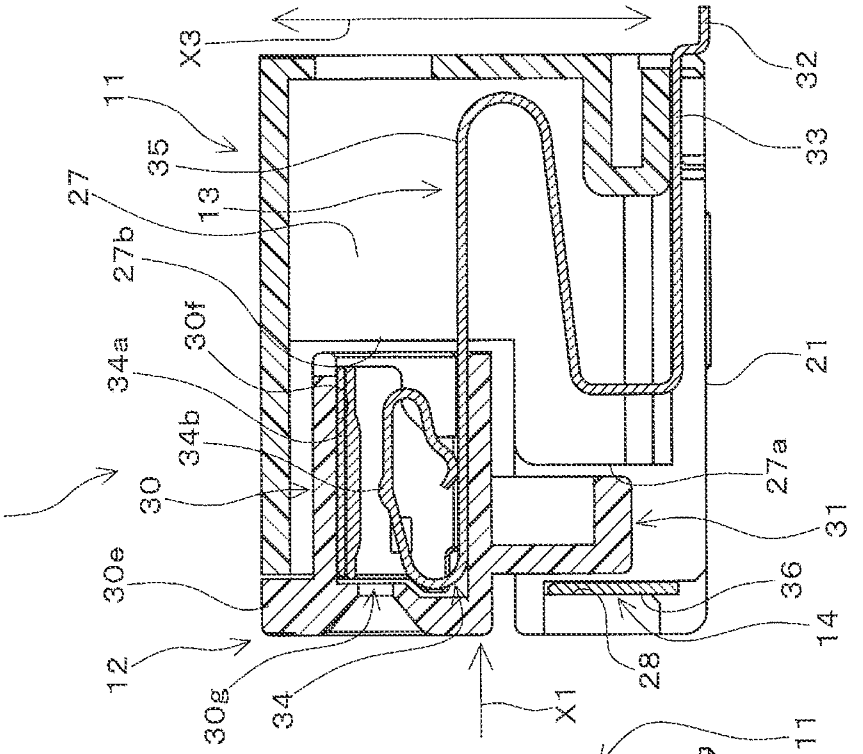
FIG. 16B is a cross-sectional view of the connector according to the second variation, taken along line D-D in FIG. 16A.
Figure 16A:
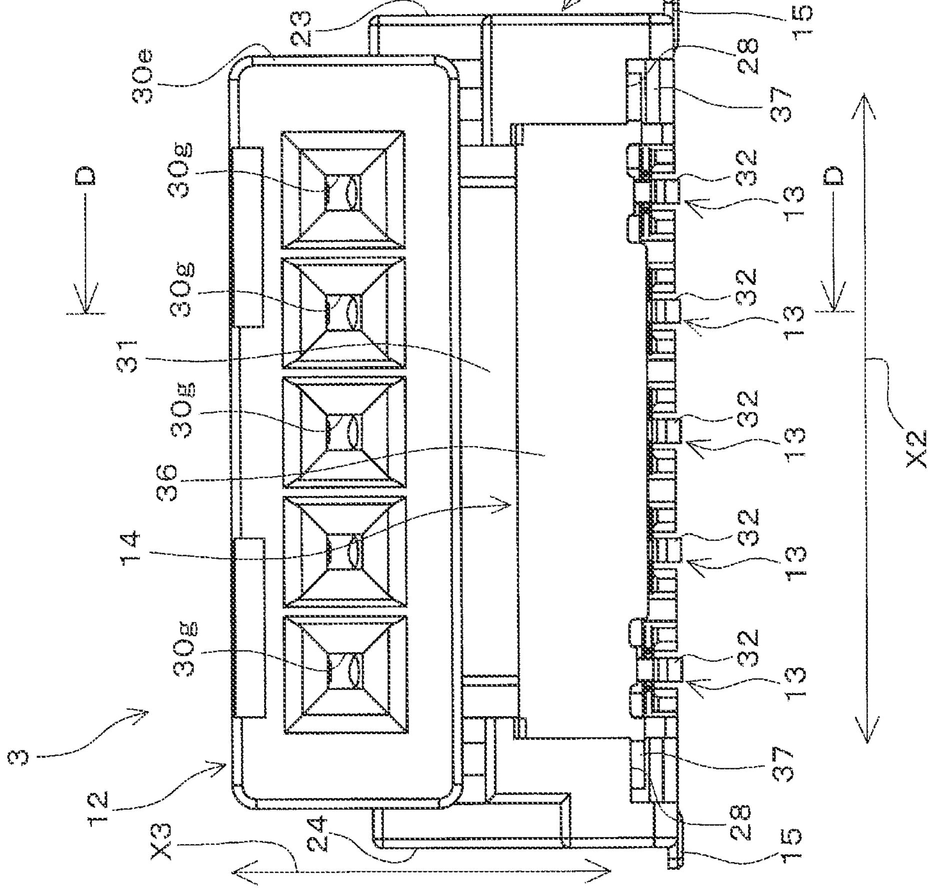
FIG. 16A is a front view of a connector according to the second variation.

In the connector 3 according to the second variation shown in FIGS. 15, 16A, and 16B, the insertion direction X1, which is the direction in which the movable housing 12 is inserted into the fixed housing 11, is parallel with the upper surface of the substrate 100, which spreads in a flat manner, when the connector 3 is disposed on the substrate 100. Also, in the connector 3, the perpendicular direction X3, which is perpendicular to both the insertion direction X1 and the width direction X2, is perpendicular to the upper surface of the substrate 100 that spreads in a flat manner. Note that the substrate 100 is not shown in FIGS. 15, 16A, and 16B.

As in the second variation shown in FIGS. 15, 16A, and 16B, the insertion direction X1 of the connector 3 may be parallel with the upper surface of the substrate 100, which spreads in a flat manner, when the connector 3 is disposed on the substrate 100.

(5) In the above-described embodiment, an example is described in which the movement restricting member 14 of the connector 1 is provided with the plate-shaped portion 36 that extends with a flat plate shape along the width direction X2 and abuts against the protrusion portion 31 of the movable housing 12, but the present invention is not limited to this example. A configuration is possible in which the portion of the movement restricting member that abuts against the protrusion portion 31 of the movable housing 12 has a shape different from that of the flat plate-shaped portion 36, and a variation such as that shown in FIGS. 17 and 18 is also possible, for example.

Figure 17:
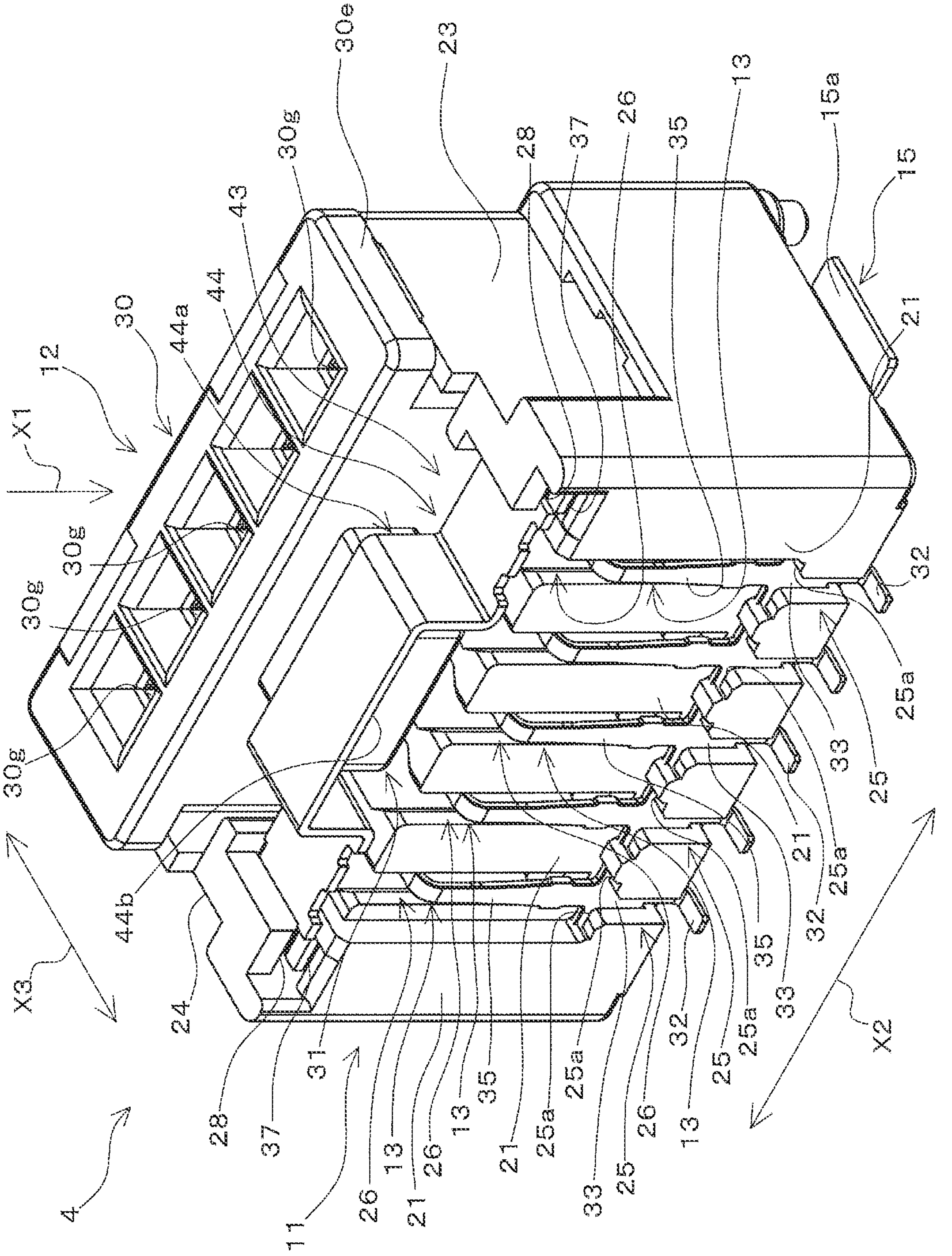
FIG. 17 is a perspective view showing a connector according to a third variation.

FIG. 17 is a perspective view showing a connector 4 according to a third variation. FIG. 18 is a front view of the connector 4 according to the third variation. Note that in the following description of the third variation, elements having a configuration similar to the configuration in the above-described embodiment and elements having a configuration corresponding to the configuration in the above-described embodiment are denoted by the same reference numerals in the drawings and/or referenced by the same reference numerals in the description in order to omit redundant descriptions.

Figure 18:
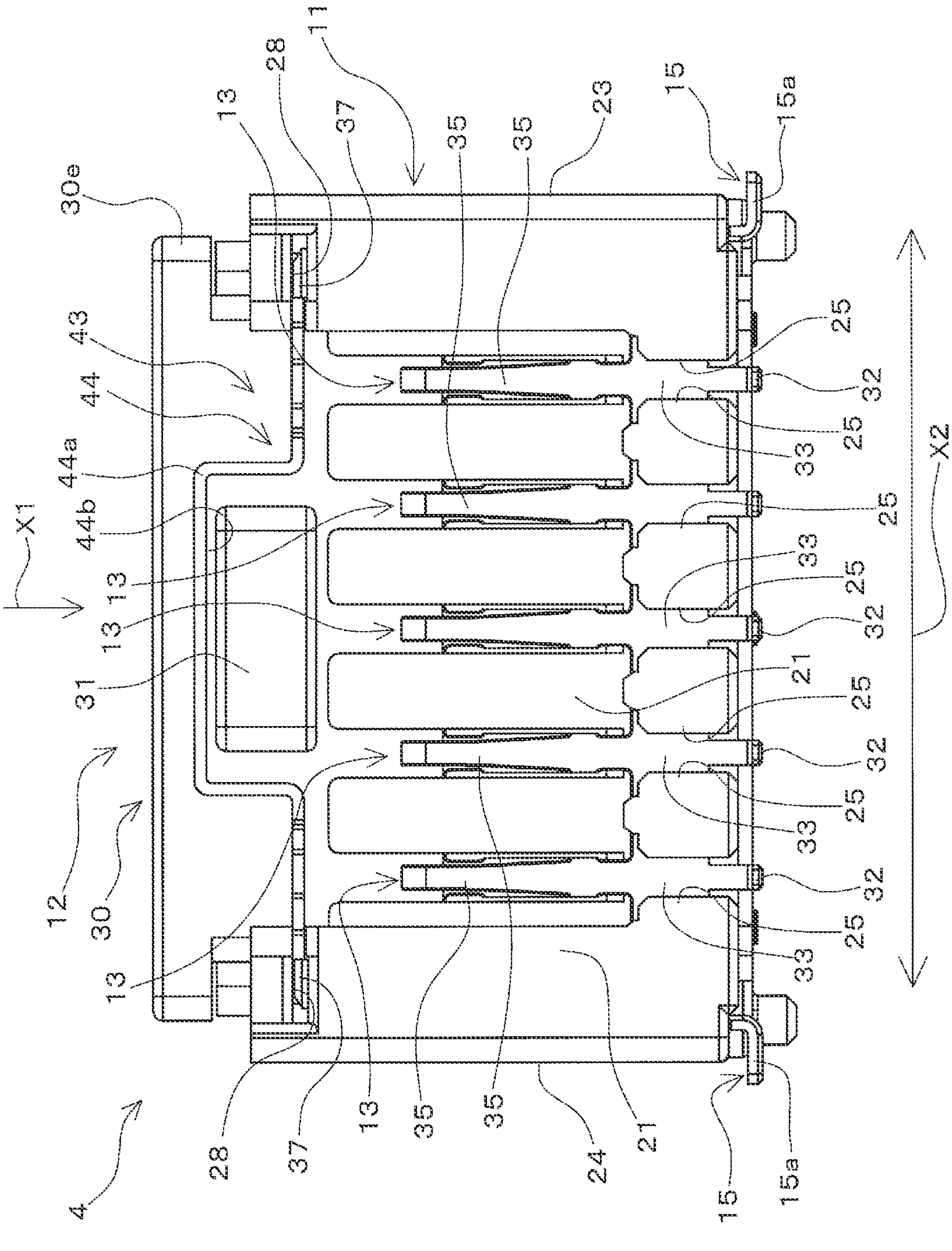
FIG. 18 is a front view of a connector according to the third variation.

The connector 4 according to the third variation shown in FIGS. 17 and 18 is provided with a metal movement restricting member 43 that is attached to the fixed housing 11 in the state where the movable housing 12 is inserted into the fixed housing 11. The movement restricting member 43 is attached in a state of being arranged at the end portion of the fixed housing 11 in the direction opposite to the insertion direction X1, on the terminal holding wall 21 side in the perpendicular direction X3.

The movement restricting member 43 includes a restricting portion 44 and a pair of attachment portions 37. The restricting portion 44 is arranged so as to extend along the width direction X2 relative to the fixed housing 11 in the state where the movement restricting member 43 is attached to the fixed housing 11. The pair of attachment portions 37 are integrated with the restricting portion 44 at the two end portions of the restricting portion 44 in the width direction X2, and are provided as portions for attachment to the fixed housing 11. Similarly to the pair of attachment portions 37 of the movement restricting member 14 of the connector 1, the aforementioned pair of attachment portions 37 are attached by being respectively press-fitted into the pair of attachment grooves 28 provided at the two end portions of the fixed housing 11 in the width direction X2.

Also, the restricting portion 44 of the movement restricting member 43 is provided as a portion that abuts against the protrusion portion 31 of the movable housing 12 so as to restrict displacement of the movable housing 12 in the direction opposite to the insertion direction X1. The restricting portion 44 is formed as a portion that extends flat due to the movement restricting member 43 being bent a plurality of times. For this reason, in the state where the movement restricting member 43 is attached to the fixed housing 11, the restricting portion 44 extends while bending a plurality of times at an intermediate position along the width direction X2 relative to the fixed housing 11.

Also, a central portion of the restricting portion 44 in the width direction X2 is provided with a bent protrusion portion 44*a* that is bent so as to project with a rectangular protrusion shape in a direction opposite to the insertion direction X1 in a view from a direction parallel with the perpendicular direction X3. In the state where the movement restricting member 43 is attached to the fixed housing 11, the bent protrusion portion 44*a* of the restricting portion 44 is arranged on the side of the protrusion portion 31 of the movable housing 12 opposite to the side in the insertion direction X1. For this reason, in the direction opposite to the perpendicular direction X1 and in the width direction X2, the bent protrusion portion 44*a* is arranged adjacent to the protrusion portion 31 of the movable housing 12 with a gap therebetween. Also, the bent protrusion portion 44*a* includes an abutting surface 44*b* that spreads in a flat manner along the width direction X2 and faces the protrusion portion 31 in the insertion direction X1. The abutting surface 44*b* constitutes a surface that abuts against the protrusion portion 31 of the movable housing 12 when the movable housing 12 becomes displaced in the direction opposite to the insertion direction X1.

In the state where the movement restricting member 43 is attached to the fixed housing 11, a gap in the direction opposite to the insertion direction X1 is formed between the protrusion 31 of the movable housing 12 and the abutting surface 44*b* of the bent protrusion portion 44*a* in the restricting portion 44 of the movement restricting member 43. When the main body portion 30 of the movable housing 12 has been inserted into the insertion hole 29 of the fixed housing 11 and becomes displaced relative to the fixed housing 11 in the direction opposite to the insertion direction X1, the abutting surface 44*b* of the restricting portion 44 of the movement restricting member 43 abuts against the protrusion portion 31 of the movable housing 12. In other words, when the main body portion 30 has been inserted into the insertion hole 29 and becomes displaced in the direction of being removed from the insertion hole 29 of the fixed housing 11, the abutting surface 44*b* of the restricting portion 44 of the movement restricting member 43 abuts against the protrusion portion 31 of the movable housing 12. In this manner, when the movable housing 12 becomes displaced in the direction opposite to the insertion direction X1 (i.e., when the movable housing 12 becomes displaced in the direction of being removed from the fixed housing 11), the movement restricting member 43 restricts the amount of displacement of the movable housing 12 relative to the fixed housing 11 by abutting against the protrusion portion 31 of the movable housing 12.

As in the third variation shown in FIGS. 17 and 18, the portion of the movement restricting member 43 that abuts against the protrusion portion 31 of the movable housing 12 may have a bent shape instead of a flat shape.

INDUSTRIAL APPLICABILITY

The present invention is broadly applicable to a connector that includes a fixed housing to be disposed on a substrate, a movable housing mounted so as to be displaceable relative to the fixed housing, and a plurality of terminals that are for electrical connection to partner connection members and support the movable housing so as to be displaceable relative to the fixed housing.

DESCRIPTION OF REFERENCE SIGNS

1, 2, 3 Connector
11, 41 Fixed housing
12 Movable housing
13 Terminals
14, 43 Movement restricting member
29 Insertion hole
30 Main body portion
31 Protrusion portion
32 Substrate connection portion
33 Fixing portion
34 Partner connection portion
35 Movable spring portion
36 Plate-shaped portion
37 Attachment portion
100 Substrate
101*a* Partner terminal (partner connection member)

What is claimed is:

1. A connector comprising:

a fixed housing configured to be disposed on a substrate;

a movable housing configured to be mounted so as to be displaceable relative to the fixed housing; and a plurality of terminals configured to be electrically connected to partner connection members and support the movable housing so as to be displaceable relative to the fixed housing, wherein the connector further comprises a movement restricting member made of a metal and configured to be attached to the fixed housing in a state where the movable housing has been inserted into the fixed housing, the movable housing includes:

a main body portion configured to be inserted in a loose-fit state into an insertion hole formed in the fixed housing; and a protrusion portion projecting from the main body portion, in a state in which the main body portion has been inserted into the insertion hole, the protrusion portion projects from the main body portion along a perpendicular direction that is perpendicular to both an insertion direction in which the main body portion is inserted into the insertion hole and a width direction in which the plurality of terminals are arranged side by side in the fixed housing, and the movement restricting member is further configured to restrict an amount of displacement of the movable housing relative to the fixed housing by abutting against the protrusion portion when the main body portion has been inserted into the insertion hole and becomes displaced relative to the fixed housing in a direction opposite to the insertion direction.

2. The connector according to claim 1, wherein each of the plurality of terminals includes:

a substrate connection portion configured to be connected to the substrate;

a fixing portion configured to be attached and fixed to the fixed housing;

a partner connection portion configured to be held by the movable housing and connected to a corresponding partner connection member among the plurality of partner connection members; and a movable spring portion integrally coupling the fixing portion and the partner connection portion and configured to support the partner connection portion so as to be displaceable relative to the fixing portion, and in a state where the main body portion has been inserted into the insertion hole, the protrusion portion projects from the main body portion toward a side in the perpendicular direction on which the fixing portions are fixed in the fixed housing.

3. The connector according to claim 1, wherein the movement restricting member includes:

a plate-shaped portion extending with a plate-like shape along the width direction relative to the fixed housing; and a plurality of attachment portions respectively provided at two end portions of the plate-shaped portion in the width direction and configured to be attached to the fixed housing, and in a state where the main body portion has been inserted into the insertion hole, the protrusion portion projects from the main body portion along the perpendicular direction and extends along the width direction.

4. The connector according to claim 3, wherein the attachment portions are attached by being press-fitted to inward sides of the fixed housing in the width direction.

5. The connector according to claim 1, wherein the insertion hole restricts an amount of displacement of the main body portion of the movable housing relative to the fixed housing in both the width direction and the perpendicular direction.

6. The connector according to claim 1, wherein the movement restricting member is provided with a flat surface constituting a suction surface that is suctioned when the connector is suctioned and transported.

* * * * *